United States Patent
Tang

(10) Patent No.: US 11,297,618 B2
(45) Date of Patent: Apr. 5, 2022

(54) METHOD FOR DEVICE TO DEVICE COMMUNICATION, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 253 days.

(21) Appl. No.: 16/781,413

(22) Filed: Feb. 4, 2020

(65) Prior Publication Data

US 2020/0178256 A1    Jun. 4, 2020

Related U.S. Application Data

(63) Continuation of application No. PCT/CN2017/096882, filed on Aug. 10, 2017.

(51) Int. Cl.
*H04W 72/04* (2009.01)
*H04W 76/14* (2018.01)
(Continued)

(52) U.S. Cl.
CPC ....... *H04W 72/0453* (2013.01); *H04L 5/0005* (2013.01); *H04L 25/022* (2013.01);
(Continued)

(58) Field of Classification Search
None
See application file for complete search history.

(56) References Cited

U.S. PATENT DOCUMENTS

2016/0073408 A1    3/2016  Sartori et al.
2018/0234888 A1*   8/2018  Yasukawa ............... H04W 4/40
(Continued)

FOREIGN PATENT DOCUMENTS

CN    104427631 A    3/2015
CN    106550318 A    3/2017
(Continued)

OTHER PUBLICATIONS

The first Office Action of corresponding Chilean application No. 202000338, dated Jul. 5, 2021.
(Continued)

*Primary Examiner* — Jenkey Van

(57) ABSTRACT

The present application discloses a method for D2D communication and a terminal device, the method including: receiving, sidelink control information (SCI) transmitted by a second terminal device; determining, by the first terminal device, that the SCI is in a first format or in a second format, where the SCI includes a resource reservation bit, and the resource reservation bit in the SCI of the first format is not used to indicate whether the second terminal device reserves a time-frequency resource for next data transmission, and the resource reservation bit in the SCI of the second format is used to indicate whether the second terminal device reserves the time-frequency resource for the next data transmission; and prohibiting data transmission on a plurality of the time-frequency resources distributed in accordance with a first time period if the first terminal device determines that the SCI is in the first format.

17 Claims, 5 Drawing Sheets

(51) Int. Cl.
*H04L 5/00* (2006.01)
*H04L 25/02* (2006.01)
*H04W 72/00* (2009.01)
*H04W 72/02* (2009.01)
*H04W 4/40* (2018.01)

(52) U.S. Cl.
CPC ......... *H04W 72/005* (2013.01); *H04W 72/02* (2013.01); *H04W 72/0406* (2013.01); *H04W 76/14* (2018.02); *H04W 4/40* (2018.02)

(56) References Cited

U.S. PATENT DOCUMENTS

| | | | |
|---|---|---|---|
| 2019/0387377 A1* | 12/2019 | Zhang | H04W 52/367 |
| 2020/0137758 A1* | 4/2020 | Chae | H04W 72/12 |
| 2021/0127361 A1* | 4/2021 | Yasukawa | H04W 4/40 |
| 2021/0360484 A1* | 11/2021 | Sarkis | H04W 28/26 |

FOREIGN PATENT DOCUMENTS

| | | |
|---|---|---|
| CN | 106612561 A | 5/2017 |
| CN | 106717091 A | 5/2017 |
| WO | WO2017105545 A1 | 6/2017 |
| WO | 2017126266 A1 | 7/2017 |

OTHER PUBLICATIONS

The second Office Action of corresponding Chinese application No. 201780091931.9, dated Jul. 22, 2020.

The EESR of corresponding European application No. 17921215.4, dated Mar. 26, 2020.

Anonymous: "UE Procedure for transmitting the PSCCH", 3GPP TS 36.213 V14.0.0, Sep. 1, 2016 (Sep. 1, 2016), p. 1-4, XP055647333.

The First Office Action of corresponding Chinese application No. 201780091931.9, dated May 7, 2019.

Samsung, GPP TSG RAN WG1 Meeting #88bis R1-1707908, Resource pool sharing between mode 3 and mode 4 UEs, published on Mar. 7, 2017.

LG Electronics, 3GPP TSG RAN WG1 Meeting #88 R1-1704840, Discussion on resource pool sharing between UEs using mode 3 and 4, published on Apr. 7, 2017.

Huawei 등. Collision avoidance for Mode 2 3GPP TSG RAN WG1 Meeting #83, Anaheim, USA Nov. 15-22, 2015; R1-156932.

Huawei 等. Discussionon sensing details for measurement and reservation3GPP TSG RAN WG1 Meeting #85, Nanjing, China, May 23-27, 2016; R1-164102.

3GPP. 'UE procedure for transmitting the PSSCH' 3GPP TS 36.213 V14.0.0, Sep. 2016.

The first Office Action of corresponding Indian application No. 201917053995, dated Mar. 17, 2021.

* cited by examiner

METHOD FOR DEVICE TO DEVICE COMMUNICATION, AND TERMINAL DEVICE

CROSS-REFERENCE TO RELATED APPLICATIONS

This application is a continuation of International Application No. PCT/CN2017/096882, filed on Aug. 10, 2017, the disclosure of which is hereby incorporated by reference in its entirety.

TECHNICAL FIELD

Embodiments of the present application relate to the field of wireless communications, and in particular, to a method for device to device (D2D) communication, and a terminal device.

BACKGROUND

The Internet of Vehicles, which may also be called a Vehicle to Everything (V2X) communication system, is a sidelink (SL) transmission technology based on D2D communication, which is different from the way of receiving or transmitting data via a base station in a conventional Long Term Evolution (LTE) system. An Internet of Vehicles system adopts a method of direct terminal to terminal communication, thereby having higher spectrum efficiency and lower transmission delay. In a Release-14 version of the 3rd Generation Partnership Project (3GPP) protocol, two transmission modes, i.e., mode 3 and mode 4, are defined for the Internet of Vehicles. The terminal device in transmission mode 3 and the terminal device in transmission mode 4 transmit data in different resource pools, where a sidelink transmission resource used by the terminal in the mode 3 is allocated by a base station, and the terminal transmits data on the sidelink according to the resource allocated by the base station; while the terminal in mode 4 may independently select a sidelink transmission resource, for example, the terminal may randomly select a resource on the sidelink or may determine the resource by way of sensing.

Since the terminal device in the transmission mode 3 is connected to the base station with its transmission resource being allocated by the base station, when the terminal device in transmission mode 3 and the terminal device in transmission mode 4 coexist, the transmission reliability of the terminal device in transmission mode 3 needs more protection.

For terminal devices that support a new Release-15 version of the 3GPP protocol, these two transmission modes may also be used. Moreover, when the terminal device of Release-15 in transmission mode 4 and the terminal device of Release-14 in transmission mode 3 transmit data in a common resource pool, there may be mutual interference, thereby affecting the transmission reliability of the terminal device of Release-14 in transmission mode 3.

Therefore, how to enable different types of terminal devices to transmit data together in a communication system and reduce mutual interference is an urgent problem to be solved.

SUMMARY

The embodiments of the present application provide a method for D2D communication and a terminal device which can reduce mutual interference when a terminal device of Release-15 in transmission mode 4 and a terminal device of Release-14 in transmission mode 3 transmit data in a common resource pool.

In a first aspect, there is provided a method for D2D communication, including: receiving, by a first terminal device, sidelink control information (SCI) transmitted by a second terminal device, where the SCI indicates a time-frequency resource used by the second terminal device to transmit a data channel;

determining, by the first terminal device, that the SCI is in a first format or in a second format, where the SCI includes a resource reservation bit, and the resource reservation bit in the SCI of the first format is not used to indicate whether the second terminal device reserves a time-frequency resource for next data transmission, and the resource reservation bit in the SCI of the second format is used to indicate whether the second terminal device reserves the time-frequency resource for the next data transmission; and prohibiting, by the first terminal device, data transmission on a plurality of time-frequency resources distributed in accordance with a first time period if the first terminal device determines that the SCI is in the first format, where the plurality of the time-frequency resources correspond to the time-frequency resource indicated by the SCI.

Therefore, the design of a new control channel format in the Release-15 version of the 3GPP protocol different from Release-14 enables the terminal device to obtain resource occupancy of another terminal device that transmits the SCI according to the format of a detected SCI. In this case, the resource avoidance may be effectively performed, so that mutual interference may be reduced when the terminal device of Release-15 in transmission mode 4 and the terminal device of Release-14 in transmission mode 3 transmit data in a common resource pool.

In a possible implementation, the first time period includes all of at least one time period which is available for time-frequency resource reservation and is allowed by a system.

In a possible implementation, the method further includes: receiving, by the first terminal device, indication information which is transmitted by a network device to indicate the first time period, where the first time period is all of at least onetime period which is available for time-frequency resource reservation and is configured for the second terminal device by the network device.

In a possible implementation, the method further includes: measuring, by the first terminal device, reference signal received power (RSRP) of the data channel transmitted by the second terminal device;

where the prohibiting, by the first terminal device, data transmission on a plurality of the time-frequency resources distributed in accordance with a first time period includes:

prohibiting, by the first terminal device, data transmission on the plurality of the time-frequency resources distributed in accordance with the first time period, if the RSRP is greater than or equal to a preset threshold.

In a possible implementation, the method further includes: determining, according to a value of the resource reservation bit, whether the second terminal device reserves the time-frequency resource for the next data transmission, if the first terminal device determines that the SCI is in the second format; prohibiting, according to a second time period $T_2$ indicated by the value of the resource reservation bit, data transmission on a plurality of the time-frequency resources distributed in accordance with a third time period $T_3$, if the first terminal device determines that the second terminal device reserves the time-frequency resource for the next data transmission, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

In a possible implementation, the second terminal device supports a communication protocol of a Release-14 version, but does not support a communication protocol of a Release-15 version, the second terminal device is in a first transmission mode, and a SCI transmitted by the second terminal device is in the first format; or the second terminal device supports the communication protocol of the Release-15 version and is in a second transmission mode, and the SCI transmitted by the second terminal device is in the second format.

In a second aspect, a method for D2D communication is provided, the method including: receiving, by a first terminal device, sidelink control information (SCI) transmitted by a second terminal device, where the SCI indicates a time-frequency resource used by the second terminal device to transmit a data channel, and the SCI includes a resource reservation bit which is used for the first terminal device to determine a time-frequency resource on which data transmission is prohibited; prohibiting, by the first terminal device, data transmission on a plurality of the determined time-frequency resources distributed in accordance with a first time period, if a value of the resource reservation bit is a first value.

Therefore, the terminal device performs resource avoidance directly according to the value of the resource reservation bit in the SCI and in accordance with a predetermined resource avoidance period, so that in the case of a common resource pool, the terminal device of Release-15 in transmission mode 4 does not interfere with data of the terminal device of Release-14 in transmission mode 3.

In a possible implementation, the first time period includes all of at least one time period which is available for time-frequency resource reservation and is allowed by a system.

In a possible implementation, the method further includes: receiving, by the first terminal device, indication information which is transmitted by a network device to indicate the first time period, where the first time period is all of at least one time period which is available for time-frequency resource reservation and is configured for the second terminal device by the network device.

In a possible implementation, the method further includes: measuring, by the first terminal device, reference signal received power (RSRP) of the data channel transmitted by the second terminal device;

where the prohibiting, by the first terminal device, data transmission on a plurality of the time-frequency resources distributed in accordance with a first time period includes: prohibiting, by the first terminal device, data transmission on the plurality of the determined time-frequency resources distributed in accordance with the first time period, if the RSRP is greater than or equal to a preset threshold.

In a possible implementation, the method further includes: prohibiting, by the first terminal device, according to a second time period $T_2$ indicated by a second value, data transmission on a plurality of the determined time-frequency resources distributed in accordance with a third time period $T_3$, if the value of the resource reservation bit is the second value; where the third time period $T_3$ satisfies: $T_3 \times M = T_2 \times N$, where M and N are both positive integers, M=N or M≠N.

In a third aspect, a method for D2D communication is provided, the method including: receiving, by a first terminal device, sidelink control information (SCI) transmitted by a second terminal device, where the SCI indicates a time-frequency resource used by the second terminal device to transmit a data channel, where the SCI includes a specific bit, and when a value of the specific bit is a first value, a resource reservation bit of the SCI is not used to indicate whether the second terminal device reserves a time-frequency resource for next data transmission, and when the value of the specific bit is a second value, the resource reservation bit is used to indicate whether the second terminal device reserves the time-frequency resource for the next data transmission, where the second value is different from the first value; prohibiting data transmission on a plurality of time-frequency resources distributed in accordance with a first time period if the first terminal device determines that the value of the specific bit is the first value, where the plurality of the time-frequency resources correspond to the time-frequency resource indicated by the SCI.

Therefore, the terminal device obtains resource occupancy of another terminal device that transmits the SCI by using a specific bit in the SCI, for example, a reserved information bit in the SCI. In this case, resource avoidance may be effectively performed, so that mutual interference may be reduced when the terminal device of Release-15 in transmission mode 4 and the terminal device of Release-14 in transmission mode 3 transmit data in a common resource pool.

In a possible implementation, the first time period includes all of at least one time period which is available for time-frequency resource reservation and is allowed by a system.

In a possible implementation, the method further includes: receiving, by the first terminal device, indication information which is transmitted by a network device to indicate the first time period, where the first time period is all of at least one time period which is available for time-frequency resource reservation and is configured for the second terminal device by the network device.

In a possible implementation, the method further includes: measuring, by the first terminal device, reference signal received power (RSRP) of the data channel transmitted by the second terminal device;

where the prohibiting, by the first terminal device, data transmission on a plurality of the time-frequency resources distributed in accordance with a first time period includes: prohibiting, by the first terminal device, data transmission on the plurality of the time-frequency resources distributed in accordance with the first time period, if the RSRP is greater than or equal to a preset threshold.

In a possible implementation, the specific bit is a reserved bit in the SCI.

In a possible implementation, the method further includes: determining, according to a value of the resource reservation bit carried by the SCI, whether the second terminal device reserves the time-frequency resource for the next data transmission if the first terminal device determines that the value of the specific bit is the second value; prohibiting, according to a second time period $T_2$ indicated by the value of the resource reservation bit, data transmission on a plurality of the time-frequency resources distributed in accordance with a third time period $T_3$, if the first terminal device determines that the second terminal device reserves the time-frequency resource for the next data transmission, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

In a possible implementation, the second terminal device supports a communication protocol of a Release 14 version, but does not support a communication protocol of a Release-15 version, the second terminal device is in a first transmission mode, and the value of the specific bit is the first value; or the second terminal device supports a communication protocol of the Release-15 version and is in a second transmission mode, and the value of the specific bit is the second value.

In a fourth aspect, a terminal device is provided, and the terminal device may perform operations of the first terminal device of the first aspect as such or any optional implementation of the first aspect. Specifically, the terminal device may include modular units used to perform the operations of the first terminal device of the first aspect as such or any possible implementation of the first aspect.

In a fifth aspect, a terminal device is provided, and the terminal device may perform operations of the first terminal device of the second aspect as such or any optional implementation of the second aspect. Specifically, the terminal device may include modular units used to perform the operations of the first terminal device of the second aspect as such or any possible implementation of the second aspect.

In a sixth aspect, a terminal device is provided, and the terminal device may perform operations of the first terminal device of the third aspect as such or any optional implementation of the third aspect. Specifically, the terminal device may include modular units used to perform the operations of the first terminal device of the third aspect as such or any possible implementation of the third aspect.

In a seventh aspect, a terminal device is provided, and the terminal device includes: a processor, a transceiver and a memory. The processor, the transceiver and the memory communicate with each other through an internal connection path. The memory is used for storing instructions, and the processor is used for executing the instructions stored by the memory. When the processor executes the instructions stored by the memory, the execution causes the terminal device to perform the method of the first aspect as such or any possible implementation of the first aspect, or causes the terminal device to implement the terminal device provided by the fourth aspect.

In an eighth aspect, a terminal device is provided, and the terminal device includes: a processor, a transceiver and a memory. The processor, the transceiver and the memory communicate with each other through an internal connection path. The memory is used for storing instructions, and the processor is used for executing the instructions stored by the memory. When the processor executes the instructions stored by the memory, the execution causes the terminal device to perform the method of the second aspect as such or any possible implementation of the second aspect, or causes the terminal device to implement the terminal device provided by the fifth aspect.

In a ninth aspect, a terminal device is provided, and the terminal device includes: a processor, a transceiver and a memory. The processor, the transceiver and the memory communicate with each other through an internal connection path. The memory is used for storing instructions, and the processor is used for executing the instructions stored by the memory. When the processor executes the instructions stored by the memory, the execution causes the terminal device to perform the method of the third aspect as such or any possible implementation of the third aspect, or causes the terminal device to implement the terminal device provided by the sixth aspect.

In a tenth aspect, a computer readable storage medium is provided, and the computer readable storage medium has stored thereon a program that causes a terminal device to perform the method for D2D communication according to any of the first aspect as such, and the implementations of the first aspect described above.

In an eleventh aspect, a computer readable storage medium is provided, and the computer readable storage medium has stored thereon a program that causes a terminal device to perform the method for D2D communication according to any of the second aspect as such, and the implementations of the second aspect described above.

In a twelfth aspect, a computer readable storage medium is provided, and the computer readable storage medium has stored thereon a program that causes a terminal device to perform the method for D2D communication according to any of the third aspect, and the implementations of the third aspect described above.

In a thirteenth aspect, a system chip is provided, and the system chip includes an input interface, an output interface, a processor and a memory; where the processor is configured to execute instructions stored by the memory, and when the instructions are executed, the processor may implement the method of the first aspect as such or any possible implementation of the first aspect.

In a fourteenth aspect, a system chip is provided, and the system chip includes an input interface, an output interface, a processor and a memory; where the processor is configured to execute instructions stored by the memory, and when the instructions are executed, the processor may implement the method of the second aspect as such or any possible implementation of the second aspect.

In a fifteenth aspect, a system chip is provided, and the system chip includes an input interface, an output interface, a processor and a memory; where the processor is configured to execute instructions stored by the memory, and when the instructions are executed, the processor may implement the method of the third aspect as such or any possible implementation of the third aspect.

In a sixteenth aspect, a computer program product including instructions is provided, and when the computer program product is run on a computer, the computer is caused to implement the method of the first aspect as such or any possible implementation of the first aspect.

In a seventeenth aspect, a computer program product including instructions is provided, and when the computer program product is running on a computer, the computer is caused to implement the method of the second aspect as such or any possible implementation of the second aspect.

In an eighteen aspect, a computer program product including instructions is provided, and when the computer program product is running on a computer, the computer is caused to implement the method of the third aspect as such or any possible implementation of the third aspect.

DESCRIPTION OF EMBODIMENTS

The technical solutions in the embodiments of the present application will be described below with reference to the accompanying drawings.

It should be understood that the technical solutions of the embodiments of the present application may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, an LTE Frequency Division Duplex (FDD) system, LTE Time Division Duplex (TDD), a Universal Mobile Telecommunication System (UMTS), and a future 5G communication system.

The present application describes various embodiments with reference to the terminal device. The terminal device may also refer to user equipment (UE), an access terminal, a subscriber unit, a subscriber station, a mobile station, a station, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to wireless modems, an in-vehicle device, a wearable device, a terminal device in the future 5G network, a terminal device in Public Land Mobile Network (PLMN), or the like.

The present application describes various embodiments with reference to the network device. The network device may be a device for communicating with the terminal device, for example, it may be a Base Transceiver Station (BTS) in the GSM system or CDMA, or may be a NodeB (NB) in the WCDMA system, or may be an Evolutional Node B (eNB or eNodeB) in the LTE system, or the network device may be a relay station, an access point, an in-vehicle device, a wearable device, a network side device in the future 5G network or a network side device in the future evolutional PLMN network, or the like.

Figure 1:
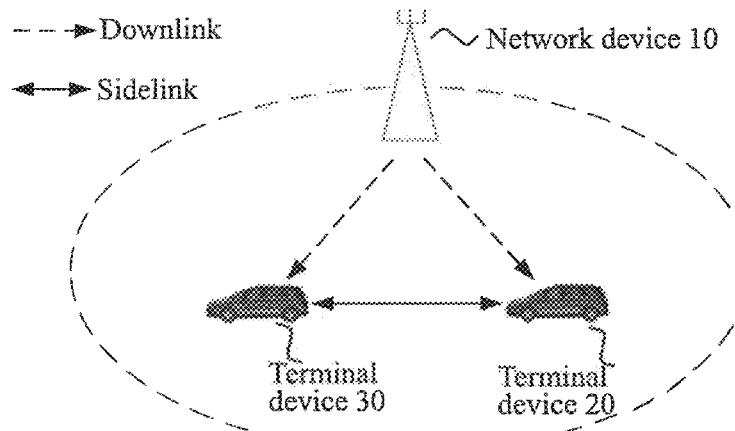
FIG. 1 is a schematic architecture diagram of an application scenario of an embodiment of the present application.
Figure 2:
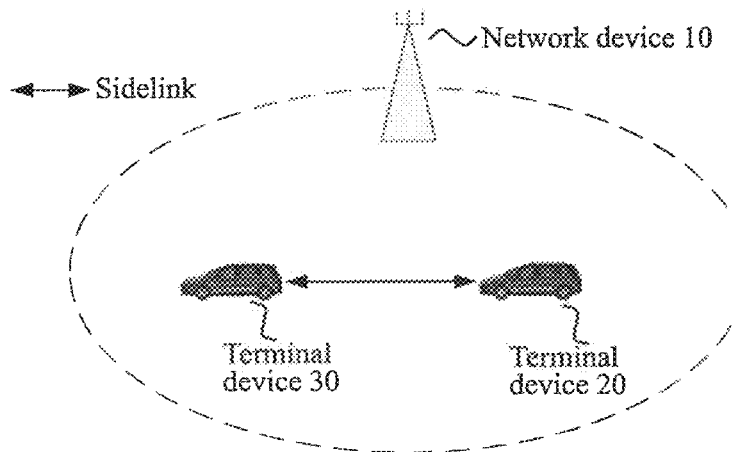
FIG. 2 is a schematic architecture diagram of another application scenario of an embodiment of the present application.

FIG. 1 and FIG. 2 are schematic diagrams of an application scenario of an embodiment of the present application. FIG. 1 exemplarily shows one network device and two terminal devices. In an implementation, a plurality of network devices may be included in the wireless communication system, and other numbers of terminal devices may be included within the coverage of each network device, which will not be limited in the embodiments of the present disclosure. In addition, the wireless communication system may further include other network entities such as a Mobile Management Entity (MME), a Serving Gateway (S-GW), and a Packet Data Network Gateway (P-GW), however the embodiments of the present disclosure are not limited thereto.

Specifically, the terminal device 20 and the terminal device 30 may communicate with each other in a cellular communication mode or a D2D communication mode. In the cellular communication mode, the terminal device communicates with other terminal devices through a cellular link with the network device. For example, as shown in FIG. 1, the terminal device 20 and the terminal device 30 may both perform data transmission with the network device. In the D2D communication mode, the two terminal devices directly communicate through a D2D link, i.e., a Sidelink (SL) or a terminal direct link. For example, as shown in FIG. 1 or FIG. 2, the terminal device 20 and the terminal device 30 directly communicate with each other through the sidelink.

The D2D communication may refer to vehicle to vehicle (V2V) communication or vehicle to Everything (V2X) communication. In V2X communication, X may generally refer to any device with wireless receiving and transmitting capabilities, for example but not limited to, a slowly moving wireless device, a fast moving in-vehicle device, or a network control node with wireless transmitting and receiving capabilities. It should be understood that the embodiments of the present disclosure are mainly applied to the scenario of V2X communication, and may also be applied to any other D2D communication scenario, which is not limited in the embodiments of the present disclosure.

In an Internet of vehicles system, there may be two types of terminal devices, that is, a terminal device with a sensing capability, such as a Vehicle User Equipment (VUE) or a Pedestrian User Equipment (PUE), and a terminal device without a sensing capability, such as a PUE. The VUE has a relatively high processing capability and is usually powered by a battery in a vehicle, while the PUE has a relatively low processing capability, and power consumption reduction is also a major factor which needs to be considered for the PUE. Therefore, in the existing Internet of vehicles system, the VUE is considered to have full receiving and sensing capabilities; while the PUE is considered to have partial or no receiving and sensing capabilities. If the PUE has partial sensing capability, the resource thereof may be selected using a sensing method that is similar to that of the VUE, and the available resource is selected on the part of the resource that can be sensed; if the PUE does not have the sensing capability, the PUE randomly selects a transmission resource from a resource pool.

In the Release-14 version of the 3GPP protocol, two transmission modes are defined, namely, transmission mode 3 (mode 3) and transmission mode 4 (mode 4). The transmission resource of the terminal device in transmission mode 3 is allocated by the base station, and the terminal device transmits data on the sidelink according to the resource allocated by the base station; the base station may allocate the resource for single transmission to the terminal device, or may allocate semi-persistent transmission resource to the terminal device. The terminal device in transmission mode 4 transmits data by way of sensing and reservation. The terminal device obtains an available resource set by way of sensing in the resource pool, and the terminal device randomly selects a resource from the available resource set for data transmission. Since services in the Internet of vehicles system have a feature of periodicity, the terminal device usually adopts a semi-persistent transmission mode, that is, after selecting a transmission resource, the terminal device continuously uses the resource in multiple transmission periods, thereby reducing the probability of resource reselection and resource conflicts. The terminal device will carry, in the control information of the current transmission, information of resource reservation for the next transmission, so that the other terminal devices may determine whether the resource is reserved and used by the terminal device by detecting the control information of the terminal device, thereby reducing the resource conflict.

Since the resource for transmission mode 3 is scheduled by the base station while the resource pool of transmission mode 4 is pre-configured or configured by the base station, the respective resource pools in the above two cases will not overlap, that is, the resource pools respectively corresponding to transmission mode 3 and transmission mode 4 are separated or orthogonal, where the terminal device in mode 3 transmits data on a time-frequency resource in the resource pool 3, while the terminal device in mode 4 transmits data on a time-frequency resource in the resource pool 4.

For a terminal device supporting a communication protocol of a new Release-15 version, the two transmission modes, i.e., transmission mode 3 and transmission mode 4, described above are also supported. When the terminal device of Release-15 and the terminal device of Release-14 transmit data together in the communication system, the terminal device having a sensing capability may select the resource through resource sensing, but for the terminal device without the sensing capability, it is difficult to avoid interference with data transmission from other terminal devices. Since the terminal device in transmission mode 3 is connected to the base station and its transmission resource is allocated by the base station, when the terminal device in transmission mode 3 and the terminal device in transmission mode 4 coexist, the transmission reliability of the terminal device in transmission mode 3 needs more protection.

In the case where a terminal device of Release-15 and a terminal device of Release-14 transmit data in a common resource pool in a system, the following three scenarios may be involved:

Scenario 1: A terminal device of Release-14 in transmission mode 3 shares a resource pool with a terminal device of Release-15 in transmission mode 4.

Scenario 2: A terminal device of Release-14 in transmission mode 4 shares a resource pool with a terminal device of Release-15 in transmission mode 3.

Scenario 3: A terminal device of Release-15 in transmission mode 3 shares a resource pool with a terminal device of Release-15 in transmission mode 4.

The embodiments of the present application are mainly directed to scenario 1. Since the terminal device of Release-14 in transmission mode 3 does not perform resource sensing, the terminal device of Release-15 in transmission mode 4 needs to perform resource sensing. When a terminal device of Release-15 in the transmission mode 4 has already selected a resource for its own data transmission and performs data transmission semi-persistently, the resource may still be allocated by the base station to the terminal device of Release-14 in transmission mode 3. Therefore, the terminal device of Release-15 in transmission mode 4 needs to perform resource sensing during transmission. For example, the terminal device of Release-15 in transmission mode 4 adopts a muting manner during some transmission time, and it performs only resource sensing and data reception without data transmission, so as to determine whether the resource is occupied by other users. If the resource is occupied, the terminal device of Release-15 in transmission mode 4 performs resource reselection to avoid interference to the terminal device of Release-14 in transmission mode 3.

Figure 3:
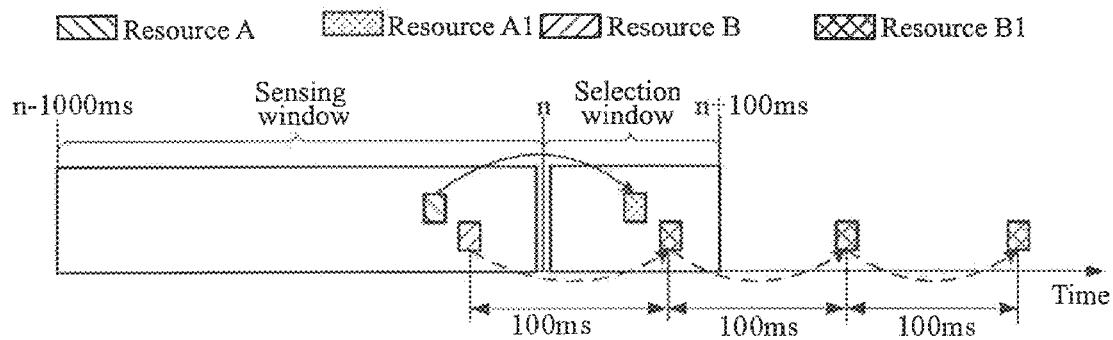
FIG. 3 is a schematic diagram of resource sensing and selecting according to an embodiment of the present application.

When the terminal device of Release-15 in transmission mode 4 performs resource sensing, it may perform resource sensing according to the method shown in FIG. 3, specifically. In the 3GPP protocol of Release-14, in each sidelink process (there are two processes for one carrier), when a new data packet arrives at time n, resource selection needs to be performed, and the terminal device performs resource selection in an interval of [n+T1, n+T2] ms according to a sensing result in the previous 1 s (i.e., 1000 ms) sensing window, and the time interval of [n+T1, n+T2] ms is called a selection window, where T1 and T2 may satisfy, for example, $T1 \leq 4$, $20 \leq T2 \leq 100$. The "previous 1 s" is relative to the time n. The specific resource selection process is as follows, where the terminal device 20 performing resource sensing on the resource of the terminal device 30 is taken as an example for description herein, and it is assumed that all resources in the selection window that may be used for transmission by the terminal device 20 are called a candidate resource set:

(1) If there is no sensing result on some sub-frames in the sensing window, for example, the terminal device 20 transmits its own data on these sub-frames, then the resources on these sub-frames at corresponding positions in the selection window are excluded from the candidate resource set.

(2) If the terminal device 20 detects a Physical Sidelink Control Channel (PSCCH) transmitted by the terminal device 30 in the previous 1 s sensing window, and the measured value of the Reference Signal Received Power (RSRP) of the Physical Sidelink Shared Channel (PSSCH) corresponding to the PSCCH is higher than the preset threshold, and the detected PSCCH indicates that the terminal device 30 that transmits the PSCCH reserves the time-frequency resource for the next transmission, then the terminal device 20 determines whether the time-frequency resource reserved by the terminal device 30 in the selection window overlaps the time-frequency resource selected by itself in the selection window for data transmission; if they overlap, that is, resource conflict occurs, then the terminal device 20 excludes the time-frequency resource in the selection window from the candidate resource set.

It should be understood that if the terminal device 20 selects for itself the time-frequency resource in the selection window for data transmission and data needs to be transmitted on all the plurality of the time-frequency resources distributed according to the time period $T_3$, at this time, if the terminal device 30 reserves the plurality of the time-frequency resources distributed according to the time period $T_2$, and the time period $T_3$ satisfies: $T_3 \times M = T_2 \times N$, where M and N are all positive integers, the terminal device 20 may exclude the plurality of the time-frequency resources distributed according to the time period $T_3$ from the candidate resource set.

(3) The terminal device 20 performs a Received Signal Strength Indicator (RSSI) measurement on the remaining resources in the candidate resource set, sorts the measurement results from high to low, and excludes the resource whose power is higher than a certain threshold from the candidate resource set, for example, the first 80% of the resources with high measurement power are excluded from the candidate resource set.

(4) The terminal device 20 randomly selects a time-frequency resource for data transmission from the last remaining candidate resource set.

It should be understood that the time-frequency resource occupied by a data channel corresponding to a certain control channel is referred to as a time-frequency resource (or a resource block) for transmitting the data channel, and there may be a plurality of time-frequency resources for transmitting the data channel in the candidate resource set in each selection window. For example, resources A1 and B1 in FIG. 3 may both be referred to as a time-frequency resource.

After selecting the time-frequency resource for data transmission, the terminal device 20 may use the time-frequency resource for Cresel times in the subsequent transmission process, where Cresel is a Resource Reselection Counter, and each time the data is transmitted, the value of Cresel will decrease by 1. When the value of Cresel is decreased to 0, the terminal device 20 generates a random number between [0, 1] and compares it with a Probability Resource Keep (P_resKeep), and this parameter indicates the probability that the terminal device continues to use the resource. If the value of the random number is greater than the parameter, the terminal device 20 performs resource reselection; if the value of the random number is less than the parameter, the terminal device 20 may continue to use the time-frequency resource for data transmission and reset the value of Cresel at the same time.

In the above description of FIG. 3, the terminal device 20 gets knowledge of the reserved resource of the terminal device 30 through the detected PSCCH when performing resource sensing in the previous is. The PSCCH includes Sidelink Control Information (SCI) that carries information related to data transmission of the terminal device 30, such as Modulation Coding Mode (MCS), time-frequency resource allocation information, and resource reservation information. The terminal device 20 that detects the SCI may obtain the position of the time-frequency resource used by the terminal device 30 for data transmission, resource reservation information, and the like through the SCI, thereby determining the resource usage of the terminal device 30.

In the 3GPP protocol of the Release-14 version (Rel-14 for short), the Physical Sideline Control Channel (PSCCH) carries the SCI that may use, for example, a specific format, such as format 1, where the SCI format 1 includes control information corresponding to the PSSCH, such as Modulation Coding Mode (MCS), time-frequency resource indication information, priority information, resource reservation information, and retransmission indication information, and the SCI format 1 further includes reserved information bits. In the Release-14 version, values of all reserved information bits of the SCI are set to 0.

It should be noted that the Resource Reservation information in the SCI is different from the Reserved Information Bits in the SCI. The resource reservation information (hereinafter also referred to as resource reservation information bit or resource reservation bit) in the SCI generally includes 4 bits that are used to indicate whether the terminal device reserves a corresponding transmission resource for subsequent data transmission. The reserved information bits in the SCI are temporarily unused bits and are generally set to 0.

In the PSCCH transmitted by the terminal device 30, the resource reservation information is used to indicate a resource reserved by the terminal device 30 for the next transmission (in the unit of millisecond, for example, the reserved time-frequency resource is the time-frequency resources B1, B2, B3, . . . , corresponding to the resource B at time domain positions of 100 ms, 200 ms, 300 ms, . . . , etc., after the resource B of the sensing window in FIG. 3), and the terminal device 20 may get knowledge of the time-frequency resource reserved by the terminal device 30 for subsequent transmission by detecting the resource reservation bit in the SCI.

For a terminal device of Release-14 in transmission mode 3, the transmission resource is allocated by the base station, and the base station may allocate a resource for one transmission to the terminal device, that is, dynamic scheduling, or allocate a resource for multiple transmissions to the terminal device, that is, Semi-Persistent Scheduling (SPS). In both of the cases, the resource reservation bits in the SCI transmitted by the terminal device are both set to 0. Because in Release-14, the terminal device in transmission mode 3 and the terminal device in transmission mode 4 transmit data in different resource pools, respectively, there will not be a terminal device in transmission mode 4 in the resource pool of transmission mode 3, that is, no other terminal device will sense the SCI of the terminal device in transmission mode 3, so that even if it is semi-persistent transmission, the setting of the resource reservation bit to 0 in both cases will not affect other terminal devices.

For a terminal device of Release-15 (Rel-15 for short) in transmission mode 4, a terminal device of Release-15 in transmission mode 4 and a terminal device of Release-14 in transmission mode 3 may transmit data using a common resource pool. The terminal device of Release-15 in transmission mode 4 may perform a single transmission (the resource reservation bit in the SCI thereof is 0), or a semi-persistent transmission (the resource reservation bit in the SCI thereof may be a corresponding resource reservation period, such as 100 ms in FIG. 3).

That is to say, the terminal device of Release-14 in transmission mode 3 may perform a single transmission or a semi-persistent transmission. In both of the cases, the resource reservation bits in the SCI thereof are both 0; and the terminal device of Release-15 in transmission mode 4 may also perform a single transmission or a semi-persistent transmission, and in the above two cases, the resource reservation bit in the SCI is 0 for the single transmission, and the resource reservation bit in the SCI is the corresponding resource reservation period for the semi-persistent transmission.

Still taking FIG. 3 as an example, first, it is assumed that the terminal device 30 is a terminal device of Release-15 in transmission mode 4. If the terminal device 30 does not reserve a resource for subsequent data transmission and the time-frequency resource for data transmission corresponding to the PSCCH transmitted by the terminal device 30 in the is sensing window before the time n is a resource A, then the terminal device 20 may directly use the resource A1 for data transmission if it plans to transmit its own data on the resource A1 in the selection window, and at this time, the value of the resource reservation bit in the SCI transmitted by the terminal device 30 is 0. If the terminal device 30 reserves a resource for subsequent data transmission and the time-frequency resource for data transmission corresponding to the PSCCH transmitted by the terminal device 30 in the sensing window is a resource B, then the terminal device 20 cannot use the resource B1 to transmit data in the selection window if the terminal device 20 plans to transmit its own data on the resource B1 in the selection window, because the terminal device 30 has reserved the resource. At this time, the value of the resource reservation bit in the SCI transmitted by the terminal device 30 is a corresponding resource reservation period, such as 100 ms in FIG. 3.

Next, it is assumed that the terminal device 30 is a terminal device of Release-14 in transmission mode 3. If the terminal device 30 does not reserve a resource for subsequent data transmission and the time-frequency resource for data transmission corresponding to the PSCCH transmitted by the terminal device 30 in the sensing window is the resource A, then the terminal device 20 may directly use the resource A1 for data transmission if it plans to transmit its own data on the resource A1 in the selection window, and at this time, the value of the resource reservation bit in the SCI transmitted by the terminal device 30 is 0. If the terminal device 30 reserves the resource for subsequent data transmission and the time-frequency resource for data transmission corresponding to the PSCCH transmitted by the terminal device 30 in the sensing window is the resource B, then the terminal device 20 cannot use the resource B1 to transmit data in the selection window if the terminal device 20 plans to transmit its own data on the resource B1 in the selection window, because the terminal device 30 has reserved the resource. At this time, different from the terminal device of Release-15, the value of the resource reservation bit in the SCI transmitted by the terminal device 30 is still 0.

As a result, there is a problem. If the terminal device 20 detects an SCI in the sensing window and the value of the resource reservation bit of the SCI is 0, the SCI may be transmitted by a terminal device of Release-14, or it may be transmitted by a terminal device of Release-15. If the terminal device 30 is a terminal device of Release-14, that is, the SCI is transmitted by the terminal device of Release-14, then the value 0 of the resource reservation bit does not indicate whether the terminal device 30 reserves the time-frequency resource for the next data transmission; if the terminal device 30 is a terminal device of Release-15, that is, the SCI is transmitted by the terminal device of Release-15, and the value 0 of the resource reservation bit indicates that the terminal device 30 does not reserve the time-frequency resource for the next transmission, because the value of the resource reservation bit should be a corresponding resource reservation period, such as 100 ms in FIG. 3, if the terminal device 30 reserves the resource.

The terminal device 20 cannot determine whether the terminal device 30 reserves the resource according to the value of the resource reservation bit of the detected SCI.

Therefore, in the embodiments of the present application, by improving the structure of the sidelink control information (SCI), a terminal device can obtain the resource occupancy of another terminal device that transmits the SCI according to the detected SCI, thereby achieving an effective resource avoidance, which reduces mutual interference when the terminal device of Release-15 in transmission mode 4 and the terminal device of Release-14 in transmission mode 3 transmit data in a common resource pool.

It should be understood that in the embodiments of the present application, a terminal device that supports the communication protocol of the Release-14 version but does not support the communication protocol of Release-15 is referred to as a terminal device of Release-14, and a terminal device that supports the communication protocol of the Release-15 version is referred to as a terminal device of Release-15. The terminal device of Release-15 may include a terminal device supporting Release-15 or a terminal device of other versions supporting Release-15, for example, a terminal device of Release-16 that supports Release-15.

It should be further understood that the following first transmission mode in the embodiments of the present application may be, for example, the transmission mode 3 in Release-14 of the foregoing 3GPP protocol, and when the terminal device is in the first transmission mode, the time-frequency resource used by the terminal device for the data transmission is a resource scheduled by the network device; the following second transmission mode may be, for example, the transmission mode 4 in Release-14 of the foregoing 3GPP protocol, and when the terminal device is in the second transmission mode, the time-frequency resource is a resource which can be independently selected by the terminal device, such as a resource randomly selected in a corresponding resource pool, or the one determined by the terminal device based on a resource sensing result.

Figure 4:
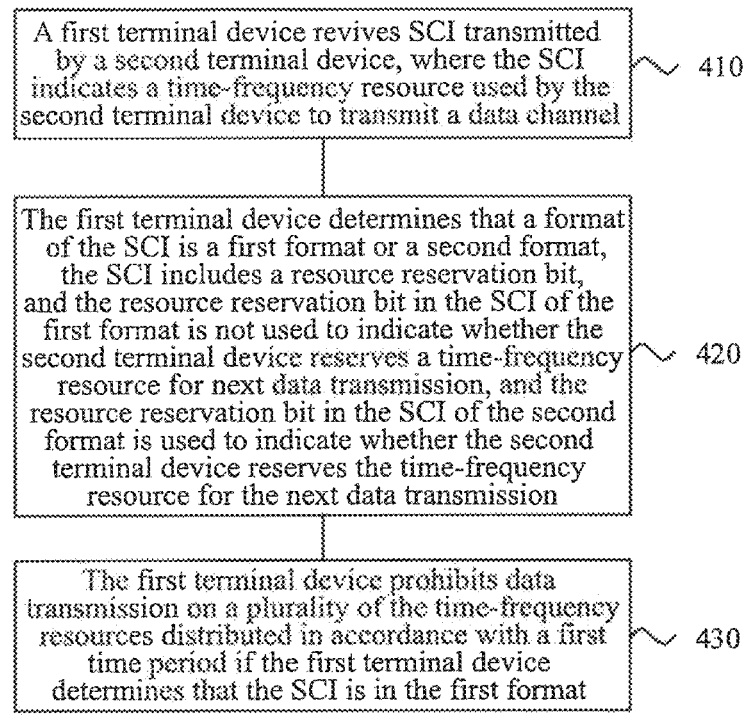
FIG. 4 is a schematic flowchart of a method for D2D communication according to an embodiment of the present application.

FIG. 4 is a schematic flowchart of a method for D2D communication according to an embodiment of the present application. The method shown in FIG. 4 may be performed by a first terminal device that may be, for example, the terminal device 20 shown in FIGS. 1 to 3. As shown in FIG. 4, the method for D2D communication includes:

In 410, a first terminal device revives SCI transmitted by a second terminal device.

The SCI indicates a time-frequency resource used by the second terminal device to transmit a data channel.

For example, the time-frequency resource that is used by the second terminal device to transmit a data channel, as indicated by the SCI, may be resource A or resource B in the sensing window shown in FIG. 3.

In 420, the first terminal device determines that a format of the SCI is a first format or a second format.

The SCI includes a resource reservation bit, and the resource reservation bit in the SCI of the first format is not used to indicate whether the second terminal device reserves a time-frequency resource for next data transmission, and the resource reservation bit in the SCI of the second format is used to indicate whether the second terminal device reserves the time-frequency resource for the next data transmission.

In an implementation, the second terminal device supports the communication protocol of the Release-14 version, but does not support the communication protocol of the Release-15 version, and the second terminal device is in the first transmission mode, and the SCI transmitted by the second terminal device is in the first format; or the second terminal device supports the communication protocol of the Release-15 version and is in the second transmission mode, and the SCI transmitted by the second terminal device is in the second format.

For example, explained in another way, the terminal device of Release-14 in the first transmission mode uses the SCI of the first format, and the first format may be, for example, format 1 in Release-14 of the 3GPP protocol. According to the above description, if the second terminal device uses the SCI of the first format, then the resource reservation bit of the SCI is set to 0 whether the second terminal device reserves a transmission resource or not. That is, the resource reservation bit cannot be used to indicate whether the second terminal device reserves the time-frequency resource for the next data transmission.

However, the terminal device of Release-15 in the second transmission mode uses the SCI of the second format, and the second format may be, for example, the newly added channel format 2 in Release-15 of the 3GPP protocol. If the second terminal device uses the SCI of the second format, then the second terminal device performs a single transmission, that is, the resource is not reserved, the resource reservation bit in the SCI is 0; if the second terminal device performs a semi-persistent transmission, that is, the resource is reserved for the next transmission, the resource reservation bit in the SCI is the corresponding resource reservation period, such as 100 ms in FIG. 3. That is, the resource reservation bit can be used to indicate whether the second terminal device reserves the time-frequency resource for the next data transmission.

If the first terminal device determines that the detected SCI is in the second format, and the value of the resource reservation bit of the SCI is 0, then it is indicated that the second terminal device is a terminal device of Release-15 and the second terminal device does not reserve any resource, and then the first terminal device may not perform resource avoidance; if the first terminal device determines that the detected SCI is in the first format and the value of the resource reservation bit of the SCI is 0, then it is indicated that the second terminal device is a terminal device of Release-14 and the second terminal device may reserve a resource or may not reserve any resource, and then the first terminal device may perform 430 at this time.

In 430, the first terminal device prohibits data transmission on a plurality of the time-frequency resources distributed in accordance with a first time period if the first terminal device determines that the SCI is in the first format.

That is, if the first terminal device determines that the detected SCI is in the first format, then it is indicated that the second terminal device is a terminal device of Release-14 in the first transmission mode, and in this case, the value of the resource reservation bit of the second terminal device is 0 regardless of whether the second terminal device reserves the time-frequency resource for the next data transmission. Therefore, the first terminal device may assume that the second terminal device reserves the resource, and therefore, according to the first time period, perform resource avoidance on a plurality of the time-frequency resources distributed in accordance with the first time period.

In an implementation, the first time period includes all of at least one time period which is available for time-frequency resource reservation and is allowed by a system.

The all of at least one time period which is available for time-frequency resource reservation and is allowed by the system, includes both a period used in the scenario of being out of a cell and a period used in the scenario of being in a cell. The period used in the scenario of being out of a cell may be, for example, agreed in the protocol, and the period used in the scenario of being in a cell may be, for example, configured by the network device.

For example, if the resource reservation period allowed by the system (i.e., the first time period) includes {20, 50, 100, 200, 300, 400, 500, 1000} ms, then, since the second terminal device does not indicate its true reservation period, the first terminal device assumes that the second terminal device may use any one of all the reservation periods allowed by the system, and therefore, resource avoidance may be performed according to each reservation period. 100 ms, 200 ms, 300 ms, 400 ms, and 500 ms in the first time period are all integer multiples of 20 ms and therefore, resource avoidance may be achieved for more reservation periods as long as it is performed according to the periods of 20 ms and 50 ms.

In an implementation, the first time period includes all of at least one time period which is available for time-frequency resource reservation and is configured for the second terminal device by the network device, where the method further includes: the first terminal device receives indication information that is transmitted by the network device to indicate the first time period.

Different from all of at least one time period which is available for time-frequency resource reservation and is allowed by the system, the first time period in the present embodiment is for the second terminal device, and the second terminal device may be, for example, a type of terminal device that supports Release-14 and is in the first transmission mode, so the first time period is the at least one time period for resource reservation which is configured by the network device for the terminal device of Release-14 in the first transmission mode.

Since the resource of the terminal device of Release-14 in the first transmission mode is allocated by the network device, the network device can get knowledge of the resource reservation period used by all the terminal devices in the resource pool corresponding to the first transmission mode. In order to assist in resource avoidance performed by the terminal device of Release-15 in the second transmission mode, the network device, for example, may broadcast the first time period of the terminal device of Release-14 in the first transmission mode, so that the terminal device of Release-15 in the second transmission mode can perform resource avoidance in accordance with the first time period broadcasted by the network device.

For example, the first time period allocated by the network device to the terminal device of Release-14 in the first transmission mode includes 100 ms and 200 ms, and then the network device may broadcast the first time period in the cell. After receiving the broadcast message, the terminal device of Release-15 in the second transmission mode can get knowledge of the first time period of the terminal device of Release-14 in the first transmission mode, so that it may perform avoidance on the resources only in accordance with 100 ms when a SCI with the resource reservation bit of 0 is detected.

In this manner, the base station assists by broadcasting the first time period to enable the terminal device of Release-15 in the second transmission mode to get knowledge of the true resource reservation period of the terminal device of Release-14 in the first transmission mode, and thus the resource avoidance is performed more efficiently.

It should be understood that in 430, the first terminal device prohibiting data transmission on the plurality of the time-frequency resources distributed in accordance with the first time period refers to the process that the first terminal device performs resource avoidance on the plurality of the time-frequency resources distributed in accordance with the first time period. Reference can be made to the foregoing description of FIG. 3 for the process of the resource avoidance.

That is, in an implementation, the method further includes: the first terminal device measures reference signal received power (RSRP) of the data channel transmitted by the second terminal device; where, in 430, the first terminal device prohibiting data transmission on the plurality of the time-frequency resources distributed in accordance with the first time period, includes: if the RSRP is greater than or equal to a preset threshold, the first terminal device prohibits data transmission on the plurality of the time-frequency resources distributed in accordance with the first time period.

The first terminal device may, for example, exclude, from the candidate resource set, a resource that has a RSRP being greater than or equal to a preset threshold and overlaps the resource selected by the first terminal itself, and the candidate resource set is all the resources available for data transmission by the terminal device 20 in the selection window described in FIG. 3. The terminal device does not transmit data on those resources that are excluded from the candidate resource set. Reference can be made to the foregoing description of FIG. 3 for the process of determining the candidate resource set by the first terminal device, which will not be repeated herein for brevity.

In an implementation, in 420, if the first terminal device determines that the detected SCI is in the second format, then the second terminal device performs 440 instead of 430, where 440 may include 441 and 442.

In 441, the first terminal device determines, according to the value of the resource reservation bit, whether the second terminal device reserves the time-frequency resource for the next data transmission.

In 442, if the first terminal device determines that the second terminal device reserves the time-frequency resource for the next data transmission, then according to the second time period $T_2$ represented by the value of the resource reservation bit, the first terminal device prohibits data transmission on a plurality of the time-frequency resources distributed in accordance with a third time period $T_3$, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

For example, the terminal device of Release-15 in the second transmission mode uses the SCI of the second format, where the second format may be, for example, the channel format 2 newly added in the 3GPP protocol of Release-15, and the SCI format 1 and the SCI format 2 are different. If the second terminal device uses the SCI of the second format, then if the second terminal device performs a single transmission, that is, it does not reserve the resource, the resource reservation bit in the SCI is 0; if the second terminal device performs a semi-persistent transmission, that is, it reserves the resource for the next transmission, the resource reservation bit in the SCI is the corresponding resource reservation period, for example, 100 ms in FIG. 3.

If the first terminal device determines that the detected SCI is in the second format, and the value of the resource reservation bit of the SCI is 0, then it is indicated that the second terminal device is a terminal device of Release-15 and the second terminal device does not reserve the resource, and the first terminal may not perform resource avoidance. If the first terminal device determines that the detected SCI is in the second format, and the value of the resource reservation bit of the SCI is not 0, then it is indicated that the second terminal device is a terminal device of Release-15 and the second terminal device reserves the resource for the next transmission, then the first terminal device performs 442, where the value of the resource reservation bit indicates the resource reservation period of the time-frequency resource reserved by the second terminal device, for example, 100 ms shown in FIG. 3.

It should be understood that if the time-frequency resource for subsequent data transmission that is selected by the first terminal device for itself in the selection window is the time-frequency resource used by the second terminal device to transmit a data channel, as indicated by the SCI (i.e., a resource conflict occurs), and the first terminal device needs to transmit data on all the plurality of the time-frequency resources distributed in accordance with the third time period $T_3$, then at this time, if the value of the resource reservation bit of the second terminal device is the second time period $T_2$ that is reserved by the second terminal device for subsequent data transmission, and the third time period $T_3$ satisfies: $T_3 \times M = T_2 \times N$, then the first terminal device does not transmit data on any of the plurality of the time-frequency resources distributed in accordance with $T_3$.

For example, if $T_2=100$ ms and $T_3=50$ ms, then the first terminal device does not transmit data on any of the plurality of the time-frequency resources distributed in accordance with 50 ms.

For another example, if $T_2=100$ ms and $T_3=200$ ms, the first terminal device does not transmit data on any of the plurality of the time-frequency resources distributed in accordance with 200 ms.

For another example, if $T_2=200$ ms and $T_3=300$ ms, the first terminal device does not transmit data on any of the plurality of the time-frequency resources distributed in accordance with 300 ms, because resource conflicts will occur at the time domain locations of 600 ms, 1200 ms, etc.

The manner shown in FIG. 4 may be represented as, for example, Table 1. Table 1 is a correspondence between a time period for resource avoidance by the first terminal device and an SCI format, where the first terminal device performs the resource avoidance in accordance with the first time period when the SCI is the first format; when the SCI is the second format, in the case where the value of the resource reservation bit is 0, the first terminal device does not perform the resource avoidance, and in the case where the value of the resource reservation bit is not 0 (but is the second time period) and if the third time period $T_3$ described above satisfies $T_3 \times M = T_2 \times N$, the first terminal device performs the resource avoidance in accordance with the third time period.

TABLE 1

| SCI Format | Value of the Resource Reservation Bit | Time Period for Resource Avoidance |
|---|---|---|
| The first format | 0 | The first time period |
| The seond format | 0 | Do not perform resource avoidance |
|  | Non-zero | The third time period |

Therefore, by designing a new control channel format in Release-15 of the 3GPP protocol different from Release-14, the terminal device can obtain the resource occupancy of another terminal device that transmits the SCI according to the format of the detected SCI. Therefore, the resource avoidance may be effectively performed, so that mutual interference may be reduced when the terminal device of Release-15 in transmission mode 4 and the terminal device of Release-14 in transmission mode 3 transmit data in a common resource pool.

Figure 5:
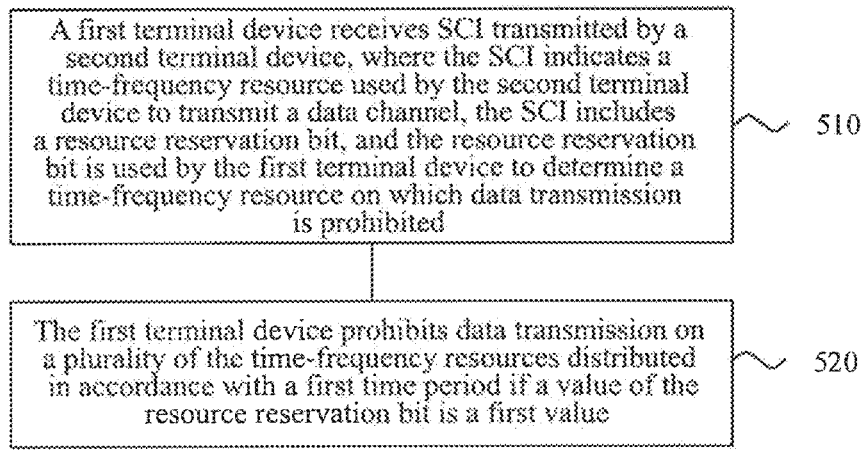
FIG. 5 is a schematic flowchart of a method for D2D communication according to another embodiment of the present application.

FIG. 5 is a schematic flowchart of a method for D2D communication according to an embodiment of the present application. The method shown in FIG. 5 may be performed by a first terminal device, and the first terminal device may be, for example, the terminal device 20 shown in FIGS. 1 to 3. As shown in FIG. 5, the method for D2D communication includes:

In 510, a first terminal device receives sidelink control information (SCI) transmitted by a second terminal device.

The SCI indicates a time-frequency resource used by the second terminal device to transmit a data channel, where the SCI includes a resource reservation bit, and the resource reservation bit is used by the first terminal device to determine a time-frequency resource on which data transmission is prohibited.

In 520, the first terminal device prohibits data transmission on a plurality of the time-frequency resources distributed in accordance with a first time period if a value of the resource reservation bit is a first value.

Different from the manner shown in FIG. 4, the SCI transmitted by the second terminal device and then received by the first terminal device includes the resource reservation bit, and as long as the value of the resource reservation bit is a first value, for example, 0, the first terminal device prohibits data transmission on the plurality of the time-frequency resources distributed in accordance with the first time period.

For example, if the second terminal device is a terminal device of Release-14 in the first transmission mode, then whether the second terminal device reserves a transmission resource or not, the resource reservation bit in the SCI transmitted by the second terminal device is set to 0.

And if the second terminal device is a terminal device of Release-15 in the second transmission mode, when the second terminal device performs a single transmission, that is, the resource is not reserved, the resource reservation bit in the SCI is 0; when the second terminal device performs a semi-persistent transmission, that is, the resource is reserved for the next transmission, the resource reservation bit in the SCI is the corresponding resource reservation period, for example, 100 ms in FIG. 3.

It is assumed that the first value is 0. There will be two cases. In the first case, if the first terminal device determines that the value of the resource reservation bit of the SCI is 0, then it is indicated that the second terminal device is a terminal device of Release-14 and the second terminal device may reserve a resource or may not reserve any resource; in the second case, if the first terminal device determines that the value of the resource reservation bit of the SCI is 0, then it is indicated that the second terminal is a terminal device of Release-15 and the second terminal device does not reserve any resource. However, even if the value of the resource reservation bit of the SCI is known to be 0, the first terminal device cannot determine which one the case is. Therefore, when the first terminal device determines that the value of the resource reservation bit is 0, the avoidance is performed in accordance with the first time period, so as to ensure that the data transmission of the terminal device of Release-14 in the first transmission mode is not interfered with.

In an implementation, the first time period includes all of at least one time period which is available for time-frequency resource reservation and is allowed by a system.

The all of at least one time period which is available for time-frequency resource reservation and is allowed by a system, includes both the period used in the scenario of being out of a cell and the period used in the scenario of being in a cell. The period used in the scenario of being out of a cell may be, for example, agreed in the protocol, while the period used in the scenario of being in a cell may be, for example, configured by the network device.

For example, if the resource reservation period allowed by the system (i.e., the first time period) includes {20, 50, 100, 200, 300, 400, 500, 1000} ms, since the second terminal device does not indicate its true reservation period, the first terminal device assumes that the second terminal device may use any one of all the reservation periods allowed by the system, and therefore performs resource avoidance in accordance with each reservation period. 100 ms, 200 ms, 300 ms, 400 ms, and 500 ms in the first time period are all integer multiples of 20 ms. Therefore, resource avoidance may be achieved for more reservation periods as long as it is performed in accordance with the periods of 20 ms and 50 ms.

In an implementation, the first time period includes all of at least one time period that is available for time-frequency resource reservation and is configured for the second terminal device by the network device, where the method further includes: receiving, by the first terminal device receive indication information that is transmitted by the network device to indicate the first time period.

Different from all of at least one time period for time-frequency resource reservation allowed by the system, the first time period in the present embodiment is for the second terminal device, and the second terminal device may be, for example, a type of terminal device that support Release-14 and is in the first transmission mode, so the first time period is the at least one time period for resource reservation that is configured by the network device for the terminal device of Release-14 in the first transmission mode.

For example, the first time period allocated by the network device to the terminal device of Release-14 in the first transmission mode includes 100 ms and 200 ms, then the network device may broadcast the first time period in the cell. After receiving the broadcast message, the terminal device of Release-15 in the second transmission mode can get knowledge of the first time period of the terminal device of Release-14 in the first transmission mode, so that it may perform avoidance on the resources only in accordance with 100 ms when a SCI with the resource reservation bit of 0 is detected.

In this manner, the base station assists by broadcasting the first time period, which enables the terminal device of Release-15 in the second transmission mode to get knowledge of the true resource reservation period of the terminal device of Release-14 in the first transmission mode, and thus the resource avoidance is performed more efficiently.

It should be understood that in 520, the first terminal device prohibiting data transmission on a plurality of the time-frequency resources distributed in accordance with the first time period refers to the process that the first terminal device performs resource avoidance on the plurality of the time-frequency resources distributed in accordance with the first time period. Reference can be made to the foregoing description of FIG. 3 for the process of the resource avoidance.

That is, in an implementation, the method further includes: the first terminal device measures reference signal received power (RSRP) of the data channel transmitted by the second terminal device; where, in 520, the first terminal device prohibiting data transmission on the plurality of the time-frequency resources distributed in accordance with the first time period, includes: if the RSRP is greater than or equal to a preset threshold, the first terminal device prohibits data transmission on the plurality of the time-frequency resources distributed in accordance with the first time period.

The first terminal device may exclude, from the candidate resource set, a resource that corresponds to a RSRP being greater than or equal to a preset threshold, and the candidate resource set is all the resources available for data transmission by the terminal device 20 in the selection window described in FIG. 3. The terminal device does not transmit data on those resources that are excluded from the candidate resource set.

In an implementation, if the first terminal device determines that the value of the resource reservation bit is a second value, then the second terminal device performs 530 instead of 520.

In 530, if the value of the resource reservation bit is a second value, the first terminal device prohibits, according to the second time period $T_2$ represented by the second value, data transmission on a plurality of the time-frequency resources distributed in accordance with a third time period $T_3$, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

For example, if the value of the resource reservation bit is a second value, for example, any non-zero value, then it is indicated that the second terminal device is a terminal device of Release-15 in the second transmission mode, and the second terminal device reserves the time-frequency resource for the next transmission, where the second value is the corresponding resource reservation period. Because for the terminal device of Release-14 in the first transmission mode, the resource reservation bit in the SCI is 0 whether the second terminal device reserves the resource or not; and for the terminal device of Release-15 in the second transmission mode, the resource reservation bit in the SCI is 0 when the second terminal device does not reserve any resource, and the resource reservation bit is the corresponding resource reservation period, for example, 100 ms in FIG. 3 instead of 0, when the second terminal device reserves the resource for the next transmission.

It should be understood that if the time-frequency resource that is used for subsequent data transmission and is selected by the first terminal device for itself in the selection window is the time-frequency resource used by the second terminal device to transmit the data channel as indicated by the SCI (i.e., a resource conflict occurs), and the first terminal device needs to transmit data on the plurality of the time-frequency resources distributed in accordance with the third time period $T_3$, then at this time, if the value of the resource reservation bit of the second terminal device is the second time period $T_2$ that is reserved by the second terminal device for subsequent data transmission, and the third time period $T_3$ satisfies: $T_3 \times M = T_2 \times N$, then the first terminal device does not transmit data on any of the plurality of the time-frequency resources distributed in accordance with $T_3$.

For example, if $T_2$=100 ms and $T_3$=50 ms, then the first terminal device does not transmit data on any of the plurality of the time-frequency resources distributed in accordance with 50 ms.

For another example, if $T_2$=100 ms and $T_3$=200 ms, the first terminal device does not transmit data on any of the plurality of the time-frequency resources distributed in accordance with 200 ms.

For another example, if $T_2$=200 ms and $T_3$=300 ms, the first terminal device does not transmit data on any of the plurality of the time-frequency resources distributed in accordance with 300 ms since there will be a resource conflict at the time domain location of 600 ms.

The manner shown in FIG. 5 may be represented by, for example, Table 2. Table 2 is a correspondence between a time period for resource avoidance by the first terminal device and an SCI format, where when the value represented by the resource reservation bit is the first value, the first terminal device performs resource avoidance in accordance with the first time period; when the value represented by the resource reservation bit is the second value and if the third time period satisfies the above $T_3 \times M = T_2 \times N$, then the first terminal device performs the resource avoidance in accordance with the third time period.

TABLE 2

| Value of the Resource Reservation Bit | Time Period of Resource Avoidance |
|---|---|
| The first value (e.g., 0) | The first time period |
| The second value (e.g., the second time period) | The third time period |

Therefore, the terminal device directly performs resource avoidance according to the value of the resource reservation bit in the SCI and in accordance with the predetermined resource avoidance period, so that the terminal device of Release-15 in transmission mode 4 does not interfere with the data of the terminal device of Release-14 in transmission mode 3 in the case of the common resource pool. Compared with the resource avoidance manner shown in FIG. 4, the one shown in FIG. 5 is simpler and more convenient.

Figure 6:
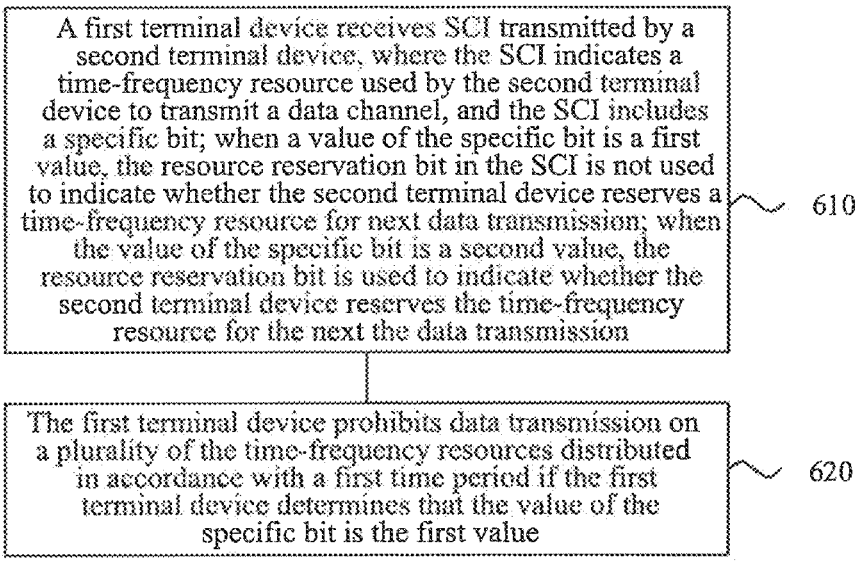
FIG. 6 is a schematic flowchart of a method for D2D communication according to still another embodiment of the present application.

FIG. 6 is a schematic flowchart of a method for D2D communication according to an embodiment of the present application. The method shown in FIG. 6 may be performed by a first terminal device, and the first terminal device may be, for example, the terminal device 20 shown in FIG. 1. As shown in FIG. 6, the method for D2D communication includes:

In 610, a first terminal device receives sidelink control information (SCI) transmitted by a second terminal device.

The SCI indicates a time-frequency resource used by the second terminal device to transmit a data channel, and the SCI includes a specific bit; when a value of the specific bit is a first value, the resource reservation bit in the SCI is not used to indicate whether the second terminal device reserves a time-frequency resource for next data transmission; when the value of the specific bit is a second value, the resource reservation bit is used to indicate whether the second terminal device reserves the time-frequency resource for the next the data transmission; the second value is different from the first value.

In an implementation, the specific bit is a reserved information bit in the SCI.

It should be noted that the reserved information bits herein are bits that are temporarily unused in the SCI, and in Release-14, the reserved information bits are set to 0. The resource reservation information (Resource Reservation) in the foregoing SCI generally includes 4 bits, which are used to indicate whether the terminal device reserves a corresponding transmission resource for subsequent data transmission.

In an implementation, the second terminal device supports a communication protocol of the Release-14 version, but does not support the communication protocol of the Release-15 version, the second terminal device is in a first transmission mode, the value of the specific bit is the first value; the second terminal device supports a communication protocol of the Release-15 version and is in a second transmission mode, and the value of the specific bit is the second value.

Specifically, if the value of the specific bit is the first value, for example, 0, there is a case where the second terminal device is a terminal device of the Release-14 in the first transmission mode, and the resource reservation bit of the SCI is set to 0 whether the second terminal device reserves the transmission resource or not. The resource reservation bit cannot be used to indicate whether the second terminal device reserves the time-frequency resource for the next data transmission.

And if the value of the specific bit is the second value, for example, 1, there is a another case where the second terminal device is a terminal device of Release-15 in the second transmission mode, the second terminal device does not reserve any resource, the resource reservation bit in the SCI is 0; and when the second terminal device reserves the resource for the next transmission, the resource reservation bit in the SCI is the corresponding resource reservation period. The resource reservation bit can be used to indicate whether the second terminal device reserves the time-frequency resource for the next data transmission.

This embodiment uses the specific bit carried by the SCI to indicate which of the above the case is. If the first terminal device determines that the value of the specific bit of the detected SCI is a first value, for example, 0, it is indicated that the second terminal device is a terminal device of Release-14 and the terminal device may reserve a resource or may not reserve any resource. At this time, the first terminal device cannot determine whether the resource is reserved through the resource reservation bit, because the resource reservation bit of the terminal device of Release-14 in the first transmission mode is always 0, so the first terminal device performs the following 620, to perform resource avoidance on all the time-frequency resources distributed in accordance with the first time period; if the first terminal device determines that the value of the specific bit of the detected SCI is a second value, for example, 1, it is indicated that the second terminal device is a terminal device of Release-15 and the second terminal device may reserve a resource or may not reserve any resource. At this time, the first terminal device may determine whether the resource is reserved through the resource reservation bit in the SCI of the second terminal device, that is, the first terminal may perform the following 630.

In 620, the first terminal device prohibits data transmission on a plurality of the time-frequency resources distributed in accordance with a first time period if the first terminal device determines that the value of the specific bit is the first value.

That is, if the value of the specific bit of the SCI is the first value, it is indicated that the second terminal device is a terminal device of Release-14 and the second terminal device may reserve a resource or may not reserve any resource; since the value of the resource reservation bit of the second device is always 0 at this time, the first terminal device cannot determine whether resource avoidance needs to be performed through the resource reservation bit. Therefore, the first terminal device assumes that the second terminal device reserves the resource, and then, according to the first time period, performs resource avoidance on the plurality of the time-frequency resources distributed in accordance with the first time period.

In an implementation, the first time period includes all of at least one time period which is available for time-frequency resource reservation and is allowed by a system.

All of the at least one time period that is available for time-frequency resource reservation and is allowed by a system includes both the period used in the scenario of being out of a cell and the period used in the scenario of being in a cell. The period used in the scenario of being out of a cell may be, for example, agreed in the protocol, and the period used in the scenario of being in a cell may be, for example, configured by the network device.

For example, if the resource reservation period allowed by the system (i.e., the first time period) includes (20, 50, 100, 200, 300, 400, 500, 1000) ms, since the second terminal device does not indicate its true reservation period, the first terminal device assumes that the second terminal device may use any one of all the reservation periods allowed by the system, therefore, resource avoidance may be performed according to each reservation period. 100 ms, 200 ms, 300 ms, 400 ms, and 500 ms in the first time period are all integer multiples of 20 ms. Therefore, resource avoidance may be achieved for more reservation periods as long as it is performed according to the periods of 20 ms and 50 ms.

In an implementation, the first time period includes all of at least one time period which is available for time-frequency resource reservation and is configured for the second terminal device by the network device, where the method further includes: the first terminal device receives indication information that is transmitted by the network device to indicate the first time period.

Different from all of the at least one time period which is available for time-frequency resource reservation and is allowed by the system, the first time period in the present embodiment is for the second terminal device, and the second terminal device may be, for example, a type of terminal device that supports Release-14 and is in the first transmission mode, so the first time period is the at least one time period for resource reservation configured by the network device for the terminal device of Release-14 in the first transmission mode.

For example, the first time period allocated by the network device to the terminal device of Release-14 in the first transmission mode includes 100 ms and 200 ms, then the network device may broadcast the first time period in the cell. After receiving the broadcast message, the terminal device of Release-15 in the second transmission mode can get knowledge of the first time period of the terminal device of Release-14 in the first transmission mode, so that it may perform avoidance on resources in accordance with only 100 ms when a SCI with the resource reservation bit of 0 is detected.

In this manner, the base station assists by broadcasting the first time period, which enables the terminal device of Release-15 in the second transmission mode to get knowledge of the true resource reservation period of the terminal device of Release-14 in the first transmission mode, and thus the resource avoidance is performed more efficiently.

It should be understood that in 620, the first terminal device prohibiting data transmission on a plurality of the time-frequency resources distributed in accordance with the first time period refers to the process that the first terminal device performs resource avoidance on the plurality of the time-frequency resources distributed in accordance with the first time period. Reference can be made to the foregoing description of FIG. 3 for the process of the resource avoidance.

That is, in an implementation, the method further includes: the first terminal device measures reference signal received power (RSRP) of the data channel transmitted by the second terminal device; where, in 430, the first terminal device prohibiting data transmission on the plurality of the time-frequency resources distributed in accordance with the first time period, includes: if the RSRP is greater than or equal to a preset threshold, the first terminal device prohibits data transmission on the plurality of the time-frequency resources distributed in accordance with the first time period.

The first terminal device may, for example, exclude, from the candidate resource set, a resource that has a RSRP being greater than or equal to a preset threshold and overlaps the resource selected by the first terminal itself, and the candidate resource set is all the resources available for data transmission by the terminal device 20 in the selection window described in FIG. 3. The terminal device does not transmit data on those resources that are excluded from the candidate resource set. Reference can be made to the foregoing description of FIG. 3 for the process of determining the candidate resource set by the first terminal device, which will not be repeated herein for brevity.

In an implementation, if the first terminal device determines that the value of the specific bit is the second value, then the second terminal device performs 630 instead of 620, where 630 may include 631 and 632.

In 631, determine whether the second terminal device reserves the time-frequency resource for the next data transmission.

In 632, if the first terminal device determines that the second terminal device reserves the time-frequency resource for the next data transmission, prohibit, according to the second time period $T_2$ represented by the value of the resource reservation bit, data transmission on a plurality of the time-frequency resources distributed in accordance with a third time period $T_3$, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

For example, if the value of the specific bit is the second value, then the resource reservation bit in the SCI is 0 when the second terminal device does not reserve the resource; and the resource reservation bit in the SCI is a corresponding resource reservation period when the second terminal device reserves the resource for the next transmission.

Explained in another way, if the value of the specific bit is the second value and the value of the resource reservation bit of the SCI is 0, then it is indicated that the second terminal device is a terminal device of Release-15 and the second terminal device does not reserve any resource, then the first terminal device may not perform resource avoidance. If the value of the specific bit is the second value and the value of the resource reservation bit of the SCI is not 0, then it is indicated that the second terminal device is a terminal device of Release-15 and the second terminal device reserves the resource for the next transmission, then the first terminal device may perform 632, and the value of the resource reservation bit indicates the resource reservation period of the time-frequency resource reserved by the second terminal device.

It should be understood that if the time-frequency resource that is used for subsequent data transmission and is selected by the first terminal device for itself in the selection window is the time-frequency resource used by the second terminal device to transmit the data channel, as indicated by the SCI (i.e., a resource conflict occurs), and the first terminal device needs to transmit data on the plurality of the time-frequency resources distributed in accordance with the third time period $T_3$, then at this time, if the value of the resource reservation bit of the second terminal device is the second time period $T_2$ that is reserved by the second terminal device for subsequent data transmission, and the third time period $T_3$ satisfies: $T_3 \times M = T_2 \times N$, then the first terminal device does not transmit data on any of the plurality of the time-frequency resources distributed in accordance with $T_3$.

For example, if $T_2$=100 ms and $T_3$=50 ms, then the first terminal device does not transmit data on any of the plurality of the time-frequency resources distributed in accordance with 50 ms.

For another example, if $T_2$=100 ms and $T_3$=200 ms, the first terminal device does not transmit data on any of the plurality of the time-frequency resources distributed in accordance with 200 ms.

For another example, if $T_2$=200 ms and $T_3$=300 ms, then the first terminal device does not transmit data on any of the plurality of the time-frequency resources distributed in accordance with 300 ms since there will be a resource conflict at the time domain location of 600 ms.

The method shown in FIG. 6 may be represented as, for example, Table 3. Table 3 is a correspondence among a value of the specific bit, a value of the resource reservation bit and a time period for resource avoidance by the first terminal device, where the first terminal device performs the resource avoidance in accordance with the first time period when the value of the specific bit is the first value; when the value of the specific bit is the second value, in the case where the value of the resource reservation bit is 0, the first terminal device does not perform resource avoidance, and in the case where the value of the resource reservation bit is not 0 (but is a specific second time period) and if the third time period satisfies the above $T_3 \times M = T_2 \times N$, the first terminal device performs the resource avoidance in accordance with the third time period.

TABLE 3

| Value of the Specific Bit | Value of the Resource Reservation Bit | Time Period for Resource Avoidance |
|---|---|---|
| The first value (e.g., 0) | 0 | The first time period |
| The second value (e.g., 1) | 0 | Do not perform resource avoidance |
|  | Non-zero | The third time period |

Therefore, the terminal device obtains the resource occupancy of another terminal device that transmits the SCI by using a specific bit in the SCI, for example, a reserved bit in the SCI, and therefore the resource avoidance is performed effectively, so that mutual interference can be reduced when the terminal device of Release-15 in transmission mode 4 and the terminal device of Release-14 in transmission mode 3 transmit data in a common resource pool.

It should also be understood that in various embodiments of the present application, the serial numbers of the above processes do not imply the order of execution, and the order of execution of each process should be determined by its function and internal logic, and should not constitute any limitation on the implementation process of the embodiments of the present application.

The method for D2D communication according to an embodiment of the present application is described in detail above. Hereinafter, apparatuses according to embodiments of the present application will be described with reference to FIG. 7 to FIG. 13, and the technical features described in the method embodiments are applicable to the following apparatus embodiments.

Figure 7:
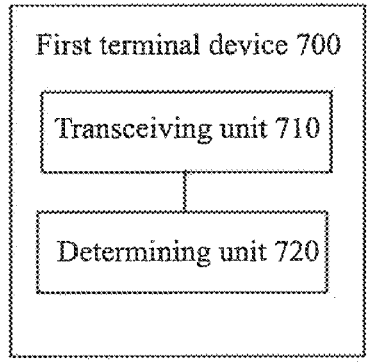
FIG. 7 is a schematic block diagram of a terminal device according to an embodiment of the present application.

FIG. 7 is a schematic block diagram of a terminal device 700 according to an embodiment of the present application.

As shown in FIG. 7, the terminal device is a first terminal device, and the first terminal device 700 includes a transceiving unit 710 and a determining unit 720, where:

the transceiving unit 710 is configured to receive sidelink control information (SCI) transmitted by a second terminal device, where the SCI indicates a time-frequency resource used by the second terminal device to transmit a data channel;

the determining unit 720 is configured to determine that the SCI received by the transceiving unit 710 is in a first format or in a second format, where the SCI includes a resource reservation bit, and the resource reservation bit in the SCI of the first format is not used to indicate whether the second terminal device reserves a time-frequency resource for next data transmission, the resource reservation bit in the SCI of the second format is used to indicate whether the second terminal device reserves the time-frequency resource for the next data transmission, and the second value is different from the first value;

the transceiving unit 710 is further configured to prohibit data transmission on a plurality of the time-frequency resources distributed in accordance with a first time period if the determining unit 720 determines that the SCI is in the first format.

Therefore, the design of a new control channel format in the Release-15 version of the 3GPP protocol different from Release-14 enables the terminal device to obtain resource occupancy of another terminal device that transmits the SCI according to the format of a detected SCI. In this case, the resource avoidance can be effectively performed, so that mutual interference may be reduced when the terminal device of Release-15 in transmission mode 4 and the terminal device of Release-14 in transmission mode 3 transmit data in a common resource pool.

In an implementation, the first time period includes all of at least one time period which is available for time-frequency resource reservation and is allowed by a system.

In an implementation, the transceiving unit 710 is further configured to: receive indication information that is transmitted by the network device to indicate the first time period, where the first time period is all of at least one period which is available for time-frequency resource reservation and is configured for the second terminal device by a network device.

In an implementation, the first terminal device further includes a measurement unit, where the measurement unit is configured to: measure reference signal received power (RSRP) of the data channel transmitted by the second terminal device;

where the transceiving unit 710 is specifically configured to: prohibit data transmission on the plurality of the time-frequency resources distributed in accordance with the first time period if the RSRP measured by the measurement unit is greater than or equal to a preset threshold.

In an implementation, the determining unit 720 is further configured to: determine, according to a value of the resource reservation bit, whether the second terminal device reserves the time-frequency resource for the next data transmission if it is determined that the SCI is in the second format; the transceiving unit is further configured to, prohibit, according to the second time period $T_2$ indicated by the value of the resource reservation bit, data transmission on a plurality of the time-frequency resources distributed in accordance with a third time period $T_3$ if the determining unit 720 determines that the second terminal device reserves the time-frequency resource for the next data transmission, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are all positive integers, M=N or M≠N.

In an implementation, the second terminal device supports a communication protocol of a Release-14 version, but does not support a communication protocol of a Release-15 version, the second terminal device is in a first transmission mode, and the SCI transmitted by the second terminal device is in the first format; or the second terminal device supports the communication protocol of the Release-15 version and is in a second transmission mode, and the SCI transmitted by the second terminal device is in the second format.

Figure 8:
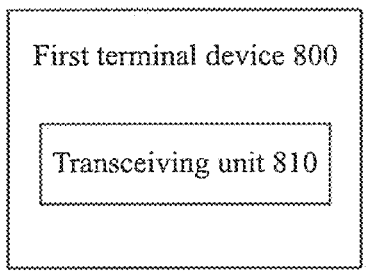
FIG. 8 is a schematic block diagram of a terminal device according to another embodiment of the present application.

FIG. 8 is a schematic block diagram of a terminal device 800 according to an embodiment of the present application. As shown in FIG. 8, the terminal device is a first terminal device, and the first terminal device 800 includes a transceiving unit 810, configured to:

receive sidelink control information (SCI) transmitted by a second terminal device, where the SCI indicates a time-frequency resource used by the second terminal device to transmit a data channel, and the SCI includes a resource reservation bit that is used for the first terminal device to determine a time-frequency resource on which data transmission is prohibited;

prohibit data transmission on a plurality of the time-frequency resources distributed in accordance with a first time period, if a value of the resource reservation bit is a first value.

Therefore, the terminal device directly performs resource avoidance according to the value of the resource reservation bit in the SCI and in accordance with a predetermined resource avoidance period, so that in the case of a common resource pool, the terminal device of Release-15 in transmission mode 4 will not interfere with data of the terminal device of Release-14 in transmission mode 3.

In an implementation, the first time period includes all of at least one time period that is available for time-frequency resource reservation and is allowed by a system.

In an implementation, the transceiving unit 810 is further configured to: receive indication information that is transmitted by a network device to indicate the first time period, where the first time period is all of at least one time period that is available for time-frequency resource reservation and is configured for the second terminal device by a network device.

In an implementation, the first terminal device further includes a measurement unit, where the measurement unit is configured to: measure reference signal received power (RSRP) of the data channel transmitted by the second terminal device;

where the transceiving unit 810 is specifically configured to prohibit data transmission on the plurality of the time-frequency resources distributed in accordance with the first time period, if the RSRP is greater than or equal to a preset threshold.

In an implementation, the transceiving unit 810 is further configured to: prohibit, according to the second time period $T_2$ indicated by the second value, data transmission on a plurality of the time-frequency resources distributed in accordance with a third time period $T_3$, if a value of the resource reservation bit is a second value, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

Figure 9:
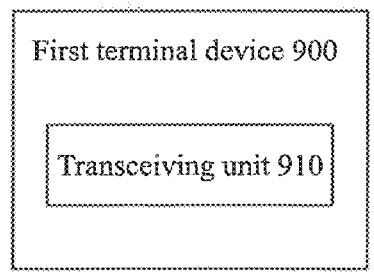
FIG. 9 is a schematic block diagram of a terminal device according to still another embodiment of the present application.

FIG. 9 is a schematic block diagram of a terminal device 900 according to an embodiment of the present application. As shown in FIG. 8, the terminal device is a first terminal device, and the first terminal device 900 includes a transceiving unit 910, configured to:

receive sidelink control information (SCI) transmitted by a second terminal device, where the SCI indicates a time-frequency resource used by the second terminal device to transmit a data channel, and the SCI includes a specific bit; when a value of the specific bit is a first value, the resource reservation bit in the SCI is not used to indicate whether the second terminal device reserves a time-frequency resource for next data transmission; when the value of the specific bit is a second value, the resource reservation bit is used to indicate whether the second terminal device reserves the time-frequency resource for the next the data transmission; the second value is different from the first value;

prohibit data transmission on a plurality of the time-frequency resources distributed in accordance with the first time period, if the first terminal device determines that the value of the specific bit is the first value.

Therefore, the terminal device obtains the resource occupancy of another terminal device that transmits the SCI by using a specific bit in the SCI, for example, a reserved bit in the SCI, so as to achieve effective resource avoidance, so that mutual interference may be reduced when the terminal device of Release-15 in transmission mode 4 and the terminal device of Release-14 in transmission mode 3 transmit data in a common resource pool.

In an implementation, the first time period includes all at least one time period which is available for time-frequency resource reservation and is allowed by a system.

In an implementation, the transceiving unit 910 is further configured to: receive indication information that is transmitted by a network device to indicate the first time period, where the first time period is all of at least one time period that is available for time-frequency resource reservation and is configured for the second terminal device by the network device.

In an implementation, the first terminal device further includes a measurement unit, and the measurement unit is configured to: measure reference signal received power (RSRP) of the data channel transmitted by the second terminal device;

where the transceiving unit 910 is specifically configured to prohibit data transmission on the plurality of the time-frequency resources distributed in accordance with the first time period if the RSRP is greater than or equal to a preset threshold.

In an implementation, the specific bit is a specific bit in the SCI.

In an implementation, the determining unit is further configured to: determine, according to a value of the resource reservation bit, whether the second terminal device reserves the time-frequency resource for the next data transmission, if the determining unit determines that the value of the specific bit is a second value;

the transceiving unit 910 is further configured to prohibit, in accordance with a second time period $T_2$ indicated by the value of the resource reservation bit, data transmission on a plurality of the time-frequency resources distributed in accordance with a third time period $T_3$, if the determining unit determines that the second terminal device reserves the time-frequency resource for the next data transmission, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

In an implementation, the second terminal device supports a communication protocol of a Release 14 version, but does not support a communication protocol of a Release-15 version, the second terminal device is in a first transmission mode, and the value of the specific bit is the first value; or the second terminal device supports the communication protocol of the Release-15 version and is in a second transmission mode, and the value of the specific bit is the second value.

Figure 10:
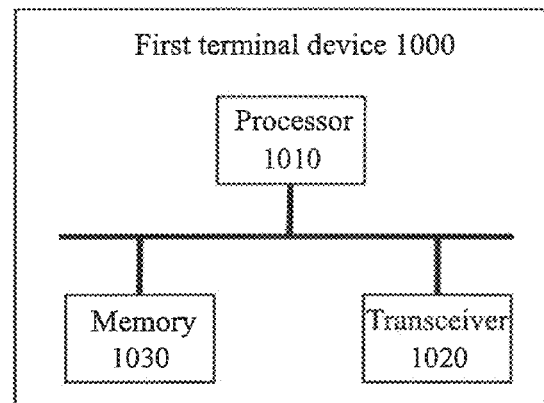
FIG. 10 is a schematic structural diagram of a terminal device according to an embodiment of the present application.

FIG. 10 is a schematic structural diagram of a terminal device 1000 according to an embodiment of the present application. As shown in FIG. 10, the terminal device is a first terminal device, and the first terminal device includes a processor 1010, a transceiver 1020, and a memory 1030, where the processor 1010, the transceiver 1020, and the memory 1030 communicate with each other through an internal connection path. The memory 1030 is configured to store instructions, and the processor 1010 is configured to execute the instructions stored by the memory 1030 to control the transceiver 1020 to receive signals or transmit signals, where the transceiver 1020 is configured to:

receive sidelink control information (SCI) transmitted by a second terminal device, where the SCI indicates a time-frequency resource used by the second terminal device to transmit a data channel;

the processor 1010 is configured to: determine that the SCI received by the transceiving unit is in a first format or a second format, where the SCI includes a resource reservation bit, and the resource reservation bit in the SCI of the first format is not used to indicate whether the second terminal device reserves a time-frequency resource for next data transmission, and the resource reservation bit in the SCI of the second format is used to indicate whether the second terminal device reserves the time-frequency resource for the next data transmission, and the second value is different from the first value;

the transceiver 1020 is further configured to prohibit data transmission on a plurality of the time-frequency resources distributed in accordance with a first time period if the determining unit determines that the SCI is in the first format.

In an implementation, the first time period includes all of at least one time period which is available for time-frequency resource reservation and is allowed by a system.

In an implementation, the transceiver 1020 is further configured to: receive indication information that is transmitted by a network device to indicate the first time period, where the first time period is all of at least one time period which is available for time-frequency resource reservation and is configured for the second terminal device by the network device.

In an implementation, the first terminal device further includes a measurement unit, where the measurement unit is configured to: measure reference signal received power (RSRP) of the data channel transmitted by the second terminal device;

where the transceiver 1020 is specifically configured to prohibit data transmission on the plurality of the time-frequency resources distributed in accordance with the first time period if the RSRP measured by the measurement unit is greater than or equal to a preset threshold.

In an implementation, the processor 1010 is further configured to: determine, according to a value of the resource reservation bit, whether the second terminal device reserves the time-frequency resource for the next data transmission if it is determined that the SCI is in the second format; the transceiving unit is further configured to prohibit, according to the second time period $T_2$ indicated by the value of the resource reservation bit, data transmission on a plurality of the time-frequency resources distributed in accordance with a third time period $T_3$ if the processor 1010 determines that the second terminal device reserves the time-frequency resource for the next data transmission, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

In an implementation, the second terminal device supports a communication protocol of a Release-14 version, but does not support a communication protocol of a Release-15 version, the second terminal device is in a first transmission mode, and the SCI transmitted by the second terminal device is in the first format; or the second terminal device supports the communication protocol of the Release-15 version and is in a second transmission mode, and the SCI transmitted by the second terminal device is in the second format.

It should be understood that in the embodiments of the present application, the processor 1010 may be a central processing unit (CPU), and the processor 1010 may also be other general-purpose processors, a digital signal processor (DSP), an application specific integrated circuit (ASIC), a field programmable gate array (FPGA) or other programmable logic devices, a discrete gate, a transistor logic device, a discrete hardware component, etc. The general purpose processor may be a microprocessor, or it may be any conventional processor, etc.

The memory 1030 may include a read only memory and a random access memory, and provides instructions and data to the processor 1010. A part of the memory 1030 may also include a non-volatile random access memory.

In the implementation process, each of the steps of the foregoing method may be completed by an integrated logic circuit of hardware in the processor 1010 or by instructions in a form of software. The steps of the methods disclosed in the embodiments of the present application may be directly completed by the hardware processor, or may be performed by a combination of hardware in the processor 1010 and software modules. The software modules may be located in a conventional storage medium in the field such as a random access memory, a flash memory, a read only memory, a programmable read only memory or an electrically erasable programmable memory, or a register. The storage medium is located in the memory 1030, and the processor 1010 reads the information in the memory 1030 and completes the steps of the foregoing method in combination with its hardware, which will not be described in detail herein.

The terminal device 1000 according to the embodiment of the present application may correspond to the first terminal device for performing the method 400 in the foregoing method 400 and to the first terminal device 700 according to the embodiment of the present application, and the units or modules in the terminal device 1000 are used for performing the actions or processes performed by the first terminal device in the foregoing method 400, respectively, details of which will not be repeated herein.

Figure 11:
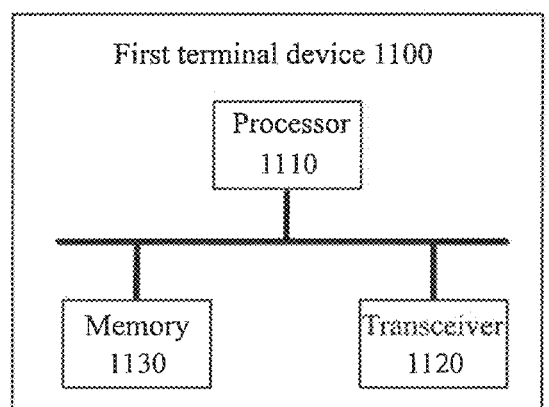
FIG. 11 is a schematic structural diagram of a terminal device according to another embodiment of the present application.

FIG. 11 is a schematic structural diagram of a terminal device 1100 according to an embodiment of the present application. As shown in FIG. 11, the terminal device is a first terminal device that includes a processor 1110, a transceiver 1120, and a memory 1130, where the processor 1110, the transceiver 1120, and the memory 1130 communicate with each other through an internal connection path. The memory 1130 is configured to store instructions, and the processor 1110 is configured to execute the instructions stored by the memory 1130 to control the transceiver 1120 to receive signals or transmit signals, where the transceiver 1120 is configured to:

receive sidelink control information (SCI) transmitted by a second terminal device, where the SCI indicates a time-frequency resource used by the second terminal device to transmit a data channel, where the SCI includes a specific bit, and the resource reservation bit is used for the first terminal device to determine a time-frequency resource on which data transmission is prohibited;

prohibit data transmission on a plurality of the time-frequency resources distributed in accordance with a first time period, if a value of the resource reservation bit is a first value.

In an implementation, the first time period includes all of at least one time period which is available for time-frequency resource reservation and is allowed by a system.

In an implementation, the transceiver 1120 is further configured to: receive indication information that is transmitted by a network device to indicate the first time period, where the first time period is all of at least one time period which is available for time-frequency resource reservation and is configured for the second terminal device by the network device.

In an implementation, the first terminal device further includes a measurement unit, where the measurement unit is configured to: measure reference signal received power (RSRP) of the data channel transmitted by the second terminal device;

where the transceiver 1120 is specifically configured to prohibit data transmission on the plurality of the time-frequency resources distributed in accordance with the first time period if the RSRP measured by the measurement unit is greater than or equal to a preset threshold.

In an implementation, the transceiver 1120 is further configured to prohibit, according to a second time period $T_2$ indicated by a second value, data transmission on a plurality of the time-frequency resources distributed in accordance with a third time period $T_3$ if the value of the resource reservation bit is the second value, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

It should be understood that in the embodiments of the present application, the processor 1010 may be a central processing unit (CPU), and the processor 1010 may also be other general-purpose processors, a digital signal processor (DSP), an application specific integrated circuit (ASIC), a field programmable gate array (FPGA) or other programmable logic devices, a discrete gate or a transistor logic device, a discrete hardware component, etc. The general purpose processor may be a microprocessor, or it may be any conventional processor, etc.

The memory 1130 may include a read only memory and a random access memory, and provides instructions and data to the processor 1110. A part of the memory 1130 may also include a non-volatile random access memory. In the implementation process, each of the steps of the foregoing method may be completed by an integrated logic circuit of hardware in the processor 1010 or by instructions in a form of software. The steps of the methods disclosed in the embodiments of the present application may be directly completed by the hardware processor, or may be performed by a combination of hardware in the processor 1110 and software modules. The software module may be located in a conventional storage medium in the field such as a random access memory, a flash memory, a read only memory, a programmable read only memory or an electrically erasable programmable memory, or a register. The storage medium is located in the memory 1130, and the processor 1110 reads the information in the memory 1130 and completes the steps of the foregoing methods in combination with its hardware, which will not be described in detail herein.

The terminal device 1100 according to the embodiment of the present application may correspond to the first terminal device for performing the method 500 in the foregoing method 500 and to the first terminal device 800 according to the embodiment of the present application, and the units or modules in the terminal device 1100 are used for performing the actions or processes performed by the first terminal device in the foregoing method 500, respectively, details of which will not be repeated herein.

Figure 12:
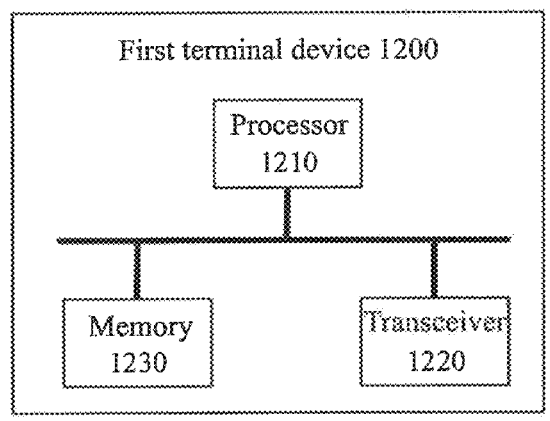
FIG. 12 is a schematic structural diagram of a terminal device according to still another embodiment of the present application.

FIG. 12 is a schematic structural diagram of a terminal device 1200 according to an embodiment of the present application. As shown in FIG. 12, the terminal device is a first terminal device that includes a processor 1210, a transceiver 1220, and a memory 1230, where the processor 1210, the transceiver 1220, and the memory 1230 communicate with each other through an internal connection path. The memory 1230 is configured to store instructions, and the processor 1210 is configured to execute the instructions stored by the memory 1230 to control the transceiver 1220 to receive signals or transmit signals, where the transceiver 1220 is configured to:

receive sidelink control information (SCI) transmitted by a second terminal device, and the SCI indicates a time-frequency resource used by the second terminal device to transmit a data channel, where the SCI includes a specific bit, and the resource reservation bit in the SCI is not used to indicate whether the second terminal device reserves a time-frequency resource for next data transmission if a value of the specific bit is a first value, the resource reservation bit is used to indicate whether the second terminal device reserves the time-frequency resource for the next the data transmission if the value of the specific bit is a second value, and the second value is different from the first value;

prohibit data transmission on a plurality of the time-frequency resources distributed in accordance with a first time period, if the first terminal device determines that the value of the specific bit is the first value.

In an implementation, the transceiver 1220 is further configured to: receive indication information that is transmitted by a network device to indicate the first time period, where the first time period is all of at least one time period which is available for time-frequency resource reservation and is configured for the second terminal device by the network device.

In an implementation, the first terminal device further includes a measurement unit, where the measurement unit is configured to: measure reference signal received power (RSRP) of the data channel transmitted by the second terminal device;

where the transceiver 1220 is specifically configured to: prohibit data transmission on the plurality of the time-frequency resources distributed in accordance with the first time period if the RSRP is greater than or equal to a preset threshold.

In an implementation, the specific bit is a specific bit in the SCI.

In an implementation, the determining unit is further configured to: determine, according to a value of the resource reservation bit, whether the second terminal device reserves the time-frequency resource for the next data transmission if the determining unit determines that the value of the specific bit is the second value;

the transceiving unit 1220 is further configured to prohibit, according to a second time period $T_2$ indicated by the value of the resource reservation bit, data transmission on a plurality of the time-frequency resources distributed in accordance with a third time period $T_3$ if the determining unit determines that the second terminal device reserves the time-frequency resource for the next data transmission, where the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, where M and N are both positive integers, M=N or M≠N.

In an implementation, the second terminal device supports a communication protocol of a Release 14 version, but does not support a communication protocol of a Release-15 version, the second terminal device is in a first transmission mode, and the value of the specific bit is the first value; or the second terminal device supports the communication protocol of the Release-15 version and is in a second transmission mode, where the value of the specific bit is the second value.

It should be understood that in the embodiments of the present application, the processor 1210 may be a central processing unit (CPU), and the processor 1210 may also be other general-purpose processors, a digital signal processor (DSP), an application specific integrated circuit (ASIC), a field programmable gate array (FPGA) or other programmable logic devices, a discrete gate or a transistor logic device, a discrete hardware component, etc. The general purpose processor may be a microprocessor, or it may be any conventional processor, etc.

The memory 1230 may include a read only memory and a random access memory, and provides instructions and data to the processor 1210. A part of the memory 1230 may also include a non-volatile random access memory. In the implementation process, each of the steps of the foregoing method may be completed by an integrated logic circuit of hardware in the processor 1210 or by instructions in a form of software. The steps of the method disclosed in combination of the embodiments of the present application may be directly completed by the hardware processor, or may be performed by a combination of hardware in the processor 1210 and software modules. The software module may be located in a conventional storage medium in the field such as a random access memory, a flash memory, a read only memory, a programmable read only memory or an electrically erasable programmable memory, or a register. The storage medium is located in the memory 1230, and the processor 1210 reads the information in the memory 1230 and completes the steps of the foregoing method in combination with its hardware, which will not be described in detail herein.

The terminal device 1200 according to the embodiment of the present application may correspond to the first terminal device for performing the method 600 in the foregoing method 600 and to the first terminal device 900 according to the embodiment of the present application, and the units or modules in the terminal device 1200 are used for performing the actions or processes performed by the first terminal device in the foregoing method 600, respectively, details of which will not be repeated herein.

Figure 13:
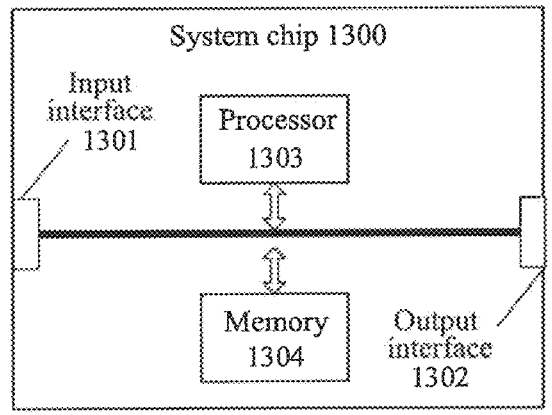
FIG. 13 is a schematic structural diagram of a system chip according to an embodiment of the present application.

FIG. 13 is a schematic structural diagram of a system chip according to an embodiment of the present application. The system chip 1300 of FIG. 13 includes an input interface 1301, an output interface 1302, at least one processor 1303 and a memory 1304. The input interface 1301, the output interface 1302, the processor 1303 and the memory 1304 communicate with each other through an internal connection path. The processor 1303 is used for executing the code in the memory 1304.

In an implementation, when the code is executed, the processor 1303 may implement the method 400 performed by the first terminal device in the method embodiment, which will not be repeated herein for brevity.

In an implementation, when the code is executed, the processor 1303 may implement the method 500 performed by the first terminal device in the method embodiment, which will not be repeated herein for brevity.

In an implementation, when the code is executed, the processor 1303 may implement the method 600 performed by the first terminal device in the method embodiment, which will not be repeated herein for brevity.

Those of ordinary skill in the art will appreciate that units and algorithm steps of the examples described with reference to the embodiment disclosed herein may be implemented in electronic hardware or a combination of computer software and electronic hardware. Whether these functions are executed in hardware or software depends on the specific application and design constraints of the technical solution. A person skilled in the art may use different methods for implementing the described functions for each specific application, but such implementation should not be considered to be beyond the scope of the present application.

A person skilled in the art may clearly understand that for convenience and brevity of the description, as to the specific working process of the system, the apparatus and the unit described above, reference can be made to corresponding processes in the foregoing method embodiments, and will not be repeated herein.

In the several embodiments provided by the present application, it should be understood that the disclosed systems, apparatuses, and methods may be implemented in other ways. For example, the apparatus embodiments described above are merely illustrative. For example, the division of units is only a logical function division, and there may be other division ways in actual implementation, for example, multiple units or components may be combined or be integrated into another system, or some features may be ignored or not executed. In addition, mutual coupling or direct coupling or communication connection shown or discussed herein may be an indirect coupling or communication connection through some interfaces, apparatuses or units, and may be in the form of electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs for the purpose of the solution of the present embodiment.

In addition, each functional unit in the embodiments of the present application may be integrated into one monitoring unit, or each unit may physically exist, or two or more units may be integrated into one unit.

The functions may be stored in a computer readable storage medium if they are implemented in the form of a software functional unit, and sold or used as a standalone product. Based on such understanding, the technical solution of the present application, in essence, or the part contributing to the existing technology or the part of the technical solution may be embodied in the form of a software product, and the computer software product is stored in a storage medium and includes instructions for enabling a computer device (which may be a personal computer, a server, or a network device, etc.) to perform all or a part of the steps described in methods in the embodiments of the present application. The above storage medium includes various media that may store program code, such as a USB flash disk, a mobile hard disk, a read-only memory (ROM), a random access memory (RAM), a magnetic disk, or an optical disk.

The above is only specific implementations of the present application, the scope of protection of the present application is not limited thereto, and changes or substitutions that may easily be derived by those skilled in the art within the technical scope disclosed in the present application should be covered by the scope of protection of the present application. Therefore, the scope of protection of the present application should be subject to the scope of protection of the claims.

What is claimed is:

1. A method for device to device (D2D) communication, comprising:
receiving, by a first terminal device, sidelink control information (SCI) transmitted by a second terminal device, wherein the SCI indicates a time-frequency resource used by the second terminal device to transmit a data channel;
determining, by the first terminal device, that the SCI is in a first format or in a second format, wherein the SCI comprises a resource reservation bit, and the resource reservation bit in the SCI of the first format is not used to indicate whether the second terminal device reserves a time-frequency resource for next data transmission, and the resource reservation bit in the SCI of the second format is used to indicate whether the second terminal device reserves the time-frequency resource for the next data transmission; and
prohibiting data transmission on a plurality of time-frequency resources distributed in accordance with a first time period if the first terminal device determines that the SCI is in the first format, wherein the plurality of time-frequency resources correspond to the time-frequency resource indicated by the SCI;
wherein the method further comprises:
determining, according to a value of the resource reservation bit, whether the second terminal device reserves the time-frequency resource for the next data transmission, if the first terminal device determines that the SCI is in the second format; and
prohibiting, according to a second time period $T_2$ indicated by the value of the resource reservation bit, data transmission on a plurality of the time-frequency resources distributed in accordance with a third time period $T_3$, if the first terminal device determines that the second terminal device reserves the time-frequency resource for the next data transmission, wherein the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, wherein M and N are both positive integers, M=N or M≠N.

2. The method according to claim 1, wherein the first time period comprises all of at least one time period which is available for time-frequency resource reservation and is allowed by a system.

3. The method according to claim 1, wherein the method further comprises:
receiving, by the first terminal device, indication information which is transmitted by a network device to indicate the first time period, wherein the first time period is all of at least one time period which is available for time-frequency resource reservation and is configured for the second terminal device by the network device time-frequency.

4. The method according to claim 1, wherein the method further comprises:
measuring, by the first terminal device, reference signal received power (RSRP) of the data channel transmitted by the second terminal device;
wherein the prohibiting, by the first terminal device, data transmission on a plurality of the time-frequency resources distributed in accordance with a first time period comprises:
prohibiting, by the first terminal device, data transmission on the plurality of the time-frequency resources distributed in accordance with the first time period, if the RSRP is greater than or equal to a preset threshold.

5. The method according to claim 1, wherein the second terminal device supports a communication protocol of a Release-14 version, but does not support a communication protocol of a Release-15 version, the second terminal device is in a first transmission mode, and the SCI transmitted by the second terminal device is in the first format; or
the second terminal device supports the communication protocol of the Release-15 version and the second terminal device is in a second transmission mode, and the control channel transmitted by the second terminal device is in the second format.

6. A terminal device, wherein the terminal device is a first terminal device, and the first terminal device comprises:
a processor, a transceiver, and a memory storing instructions, wherein
when executed by the processor, the instructions cause the terminal device to perform the method for D2D communication according to claim 1.

7. A computer readable storage medium, wherein the computer readable storage medium has stored thereon a program that causes a terminal device to perform the method for D2D communication according to claim 1.

8. A terminal device, wherein the terminal device is a first terminal device, and the first terminal device comprises:
a processor, a transceiver, and a memory for storing instructions, wherein when executed by the processor, the instructions cause the transceiver to:
receive sidelink control information (SCI) transmitted by a second terminal device, wherein the SCI indicates a time-frequency resource used by the second terminal device to transmit a data channel, and the SCI comprises a resource reservation bit which is used for the first terminal device to determine a time-frequency resource on which data transmission is prohibited; and
prohibit data transmission on a plurality of the determined time-frequency resources distributed in accordance with a first time period, if a value of the resource reservation bit is a first value;
wherein the instructions further cause the transceiver to:
prohibit, according to a second time period $T_2$ indicated by a second value, data transmission on a plurality of the determined time-frequency resources distributed in accordance with a third time period $T_3$ if a value of the resource reservation bit is the second value, wherein the plurality of the determined time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, wherein M and N are both positive integers, M=N or M≠N.

9. The terminal device according to claim 8, wherein the first time period comprises all of at least one of time period which is available for time-frequency resource reservation and is allowed by a system.

10. The terminal device according to claim 8, wherein the instructions further cause the transceiver to:
receive indication information which is transmitted by a network device to indicate the first time period, wherein the first time period is all of at least one time period which is available for time-frequency resource reservation and is configured for the second terminal device by the network device.

11. The terminal device according to claim 8, wherein the instructions further cause the processor to:
measure reference signal received power (RSRP) of the data channel transmitted by the second terminal device;
the instructions further cause the transceiver to:
prohibit data transmission on the plurality of the determined time-frequency resources distributed in accordance with the first time period, if the RSRP measured by the measurement unit is greater than or equal to a preset threshold.

12. A terminal device, wherein the terminal device is a first terminal device and the first terminal device comprises:
a processor, a transceiver, and a memory for storing instructions, wherein when executed by the processor, the instructions cause the transceiver to
receive sidelink control information (SCI) transmitted by a second terminal device, wherein the SCI indicates a time-frequency resource used by the second terminal device to transmit a data channel, wherein the SCI comprises a specific bit, and when a value of the specific bit is a first value, a resource reservation bit of the SCI is not used to indicate whether the second terminal device reserves a time-frequency resource for next data transmission, and when the value of the specific bit is a second value, the resource reservation bit is used to indicate whether the second terminal device reserves the time-frequency resource for the next data transmission, wherein the second value is different from the first value; and
prohibit data transmission on a plurality of time-frequency resources distributed in accordance with a first time period if the first terminal device determines that the value of the specific bit is the first value, wherein the plurality of time-frequency resources correspond to the time-frequency resource indicated by the SCI;

wherein the instructions cause the processor to determine, according to a value of the resource reservation bit, whether the second terminal device reserves the time-frequency resource for the next data transmission if the determining unit determines that the value of the specific bit is the second value; and the instructions cause the transceiver to prohibit, in accordance with a second time period $T_2$ indicated by the value of the resource reservation bit, data transmission on the plurality of the time-frequency resources distributed in accordance with a third time period $T_3$ if the determining unit determines that the second terminal device reserves the time-frequency resource for the next data transmission, wherein the plurality of the time-frequency resources distributed in accordance with the third time period $T_3$ are transmission resources selected by the first terminal device for data to be transmitted of the first terminal device, and the third time period $T_3$ satisfies: $T_3 \times M = T_2 \times N$, wherein M and N are both positive integers, M=N or M≠N.

13. The terminal device according to claim 12, wherein the first time period comprises all of at least one of time period which is available for time-frequency resource reservation and is allowed by a system.

14. The terminal device according to claim 12, wherein the instructions further cause the transceiver to:
receive indication information which is transmitted by a network device to indicate the first time period, wherein the first time period is all of at least one time period which is available for time-frequency resource reservation and is configured for the second terminal device by the network device.

15. The terminal device according to claim 12, wherein the instructions cause the processor to:
measure reference signal received power (RSRP) of the data channel transmitted by the second terminal device;
wherein the instructions cause the transceiver to:
prohibit data transmission on the plurality of the time-frequency resources distributed in accordance with the first time period, if the RSRP is greater than or equal to a preset threshold.

16. The terminal device according to claim 12, wherein the specific bit is a reserved bit in the SCI.

17. The terminal device according to claim 12, wherein the second terminal device supports a communication protocol of a Release-14 version, but does not support a communication protocol of a Release-15 version, the second terminal device is in a first transmission mode, and the value of the specific bit is the first value; or
the second terminal device supports the communication protocol of the Release-15 version and is in a second transmission mode, and the value of the specific bit is the second value.

* * * * *